United States Patent [19]

Bernard, II et al.

[11] Patent Number: 5,472,309
[45] Date of Patent: * Dec. 5, 1995

[54] SYSTEM FOR DELIVERY

[75] Inventors: Clay Bernard, II, Richmond; Robert D. Lichti, Sr., Lake Almanor Peninsula; Stanley H. Lukken, San Francisco; Daniel C. Perry, San Jose, all of Calif.

[73] Assignee: Computer Aided Systems, Inc., Hayward, Calif.

[ * ] Notice: The portion of the term of this patent subsequent to Sep. 21, 2010, has been disclaimed.

[21] Appl. No.: 310,012

[22] Filed: Sep. 21, 1994

Related U.S. Application Data

[63] Continuation of Ser. No. 125,371, Sep. 21, 1993, abandoned, which is a continuation of Ser. No. 712,485, Jun. 10, 1991, Pat. No. 5,246,332, which is a division of Ser. No. 568,534, Aug. 15, 1990, Pat. No. 5,171,120, which is a continuation of Ser. No. 481,719, Feb. 16, 1990, abandoned, which is a continuation of Ser. No. 158,310, Feb. 22, 1988, abandoned, which is a continuation-in-part of Ser. No. 800,337, Nov. 21, 1985, abandoned, Ser. No. 824,718, Jan. 31, 1986, abandoned, Ser. No. 815,808, Jan. 2, 1986, abandoned, Ser. No. 15,083, Feb. 17, 1987, abandoned, Ser. No. 821,257, Jan. 22, 1986, Pat. No. 4,752,175, and Ser. No. 31,989, Mar. 30, 1987, abandoned, which is a continuation-in-part of Ser. No. 732,927, May 13, 1985, abandoned.

[51] Int. Cl.$^6$ .................................................. B65G 1/133
[52] U.S. Cl. ............................................................ 414/786
[58] Field of Search ................................... 414/786, 787, 414/331, 222, 223, 403, 276–278, 417; 198/350, 358, 347.2, 465.2, 465.3; 364/478; 211/1.5

[56] References Cited

U.S. PATENT DOCUMENTS

| 844,806 | 2/1907 | Jones | 198/801 X |
|---|---|---|---|
| 931,570 | 8/1909 | Courtney | 198/798 |
| 1,135,316 | 4/1915 | Olson | 198/801 X |

(List continued on next page.)

FOREIGN PATENT DOCUMENTS

| 123556 | 10/1984 | European Pat. Off. | 414/331 |
|---|---|---|---|
| 140393 | 8/1985 | European Pat. Off. | |
| 0242409 | 10/1987 | European Pat. Off. | |
| 272340 | 6/1988 | European Pat. Off. | 414/331 |
| 1343507 | 10/1963 | France | |
| 1427294 | 4/1966 | France | |
| 424919 | 9/1924 | Germany | 198/797 |
| 131278 | 10/1979 | Japan | 414/277 |
| 57-194839 | 11/1982 | Japan | |
| 48306 | 3/1984 | Japan | 414/331 |
| 59-48308 | 3/1984 | Japan | 414/331 |
| 102703 | 6/1984 | Japan | 414/331 |
| 128104 | 7/1984 | Japan | 414/331 |
| 212304 | 12/1984 | Japan | 414/331 |
| 44402 | 3/1985 | Japan | 414/331 |
| 52402 | 3/1985 | Japan | 414/273 |
| 60-93007 | 5/1985 | Japan | 414/331 |
| 61-27804 | 2/1986 | Japan | |
| 55004 | 3/1986 | Japan | 414/331 |
| 81303 | 4/1986 | Japan | 414/331 |
| 61-81302 | 4/1986 | Japan | 414/331 |

(List continued on next page.)

*Primary Examiner*—David A. Bucci
*Attorney, Agent, or Firm*—Fish & Richardson

[57] ABSTRACT

An integrated warehousing system for storing and retrieving goods as well as preparing the goods for their ultimate disposition is disclosed. The warehousing system includes numerous modular components that may be added to or subtracted from the system to accommodate a particular warehousing need. Inventoried goods placed in containers are stored on a rotational storage carousel, A plurality of work stations, each having an associated temporary storage queues are integrated with the carousel to facilitate high volume handling operations. Containers, delivered from the storage carousel, are brought to the temporary queue where they are held until an operator is prepared to work with the goods stored therein. The container is then delivered to a work area, where the operator performs the desired task. The containers, may then be delivered either to another appropriate work station or back to the storage carousel.

2 Claims, 19 Drawing Sheets

5,472,309
Page 2

U.S. PATENT DOCUMENTS

| | | | |
|---|---|---|---|
| 1,525,870 | 2/1925 | Lee | 198/800 |
| 1,669,497 | 5/1928 | Steegmuller | 193/35 A |
| 1,718,512 | 6/1929 | Wright et al. | 198/793 X |
| 2,226,742 | 12/1940 | Raymond | 198/576 X |
| 2,353,638 | 7/1944 | Beaulieu et al. | 198/341 |
| 2,707,548 | 5/1955 | Fürst | 198/477.1 |
| 2,734,617 | 2/1956 | Temple | 198/435 X |
| 2,736,419 | 2/1956 | Ferro | 198/859 X |
| 3,068,987 | 12/1962 | Franklin | 198/435 X |
| 3,133,622 | 5/1964 | Immesberger | 198/465.1 X |
| 3,148,785 | 9/1964 | Fauconnier | 414/243 |
| 3,184,032 | 3/1965 | Jonsson | 198/801 X |
| 3,244,304 | 4/1966 | Pollak, Jr. et al. | 414/421 |
| 3,268,055 | 8/1966 | Stein et al. | 198/801 X |
| 3,368,688 | 1/1968 | Weiss et al. | 211/122 X |
| 3,379,321 | 4/1968 | Weir | 414/262 X |
| 3,402,835 | 9/1968 | Saul | 414/273 |
| 3,402,836 | 9/1968 | Debrey et al. | 414/273 |
| 3,415,353 | 12/1968 | Oertle, Jr. | 198/801 X |
| 3,424,321 | 1/1969 | Lichti | 198/797 X |
| 3,448,870 | 6/1969 | Gallo et al. | 414/421 |
| 3,509,688 | 5/1970 | Hartbauer et al. | 53/250 X |
| 3,534,850 | 10/1970 | Rogers et al. | 414/276 X |
| 3,547,281 | 12/1970 | Lichti | 414/251 |
| 3,554,391 | 1/1971 | Goodell | 414/331 |
| 3,571,892 | 3/1971 | Levy | 198/859 X |
| 3,581,865 | 6/1971 | Adams | 198/525 |
| 3,593,862 | 7/1971 | Pierson | 198/435 X |
| 3,627,110 | 12/1971 | Lichti | 198/798 |
| 3,633,726 | 1/1972 | Carlier | 198/465.4 X |
| 3,642,158 | 2/1972 | Koennecke et al. | 414/421 |
| 3,656,608 | 4/1972 | Lichti | 198/798 |
| 3,661,284 | 5/1972 | Traube | 414/331 X |
| 3,670,867 | 6/1972 | Traube | 414/331 X |
| 3,672,485 | 6/1972 | Walters | 198/435 X |
| 3,695,462 | 10/1972 | Sullivan | 414/273 X |
| 3,726,383 | 4/1973 | Bornfleth et al. | 198/358 X |
| 3,750,804 | 8/1973 | Lemelson | 414/278 |
| 3,780,852 | 12/1973 | Weiss et al. | 414/331 X |
| 3,792,757 | 2/1974 | Musser | 198/530 X |
| 3,792,785 | 2/1974 | Weir | 414/278 |
| 3,796,327 | 3/1974 | Meyer et al. | 414/273 X |
| 3,803,556 | 4/1974 | Duffy | 364/469 |
| 3,805,974 | 4/1974 | Andersson et al. | 414/276 |
| 3,809,263 | 5/1974 | Dodd et al. | 414/223 |
| 3,889,797 | 6/1975 | Naito et al. | 198/347 |
| 3,902,427 | 9/1975 | Kastenbein | 414/787 X |
| 3,903,810 | 9/1975 | Jones | 198/854 |
| 3,928,114 | 12/1975 | Aylon | 198/341 X |
| 3,954,427 | 5/1976 | Snyder | 55/217 |
| 3,958,102 | 5/1976 | Burt | 414/273 X |
| 3,989,090 | 11/1976 | Kawaii | 414/277 X |
| 4,013,186 | 3/1977 | Barton et al. | 414/628 |
| 4,018,325 | 4/1977 | Rejsa | 198/460 |
| 4,071,150 | 1/1978 | Thompson et al. | 414/270 |
| 4,088,237 | 5/1978 | Brown | 414/270 X |
| 4,110,214 | 8/1978 | Pfeffer | 198/859 X |
| 4,168,009 | 9/1979 | Ide | 414/142.1 |
| 4,189,273 | 2/1980 | Soderstrom et al. | 414/285 |
| 4,192,496 | 3/1980 | Baselice et al. | 198/463.3 X |
| 4,227,607 | 10/1980 | Malavenda | 198/460 |
| 4,232,779 | 11/1980 | Khoylian et al. | 198/465.3 X |
| 4,239,436 | 12/1980 | Wildenaur | 414/276 |
| 4,244,672 | 1/1981 | Lund | 198/350 |
| 4,307,988 | 12/1981 | Page et al. | 414/276 |
| 4,324,326 | 4/1982 | Khoylian et al. | 198/576 X |
| 4,379,671 | 4/1983 | Cochran | 414/331 |
| 4,389,157 | 6/1983 | Bernard, II et al. | 414/787 |
| 4,394,104 | 7/1983 | Camerini et al. | 414/276 |
| 4,422,554 | 12/1983 | Lichti | 198/833 X |
| 4,484,289 | 11/1984 | Hemond | 198/358 X |
| 4,492,504 | 1/1985 | Hainsworth | 414/278 X |
| 4,505,375 | 3/1985 | Kuster | 198/801 X |
| 4,519,522 | 5/1985 | McElwee | 414/273 X |
| 4,542,808 | 9/1985 | Lloyd, Jr. et al. | 198/349.7 X |
| 4,547,343 | 10/1985 | Takano et al. | 414/417 X |
| 4,561,060 | 12/1985 | Hemond | 364/478 |
| 4,561,820 | 12/1985 | Matheny, III et al. | 414/331 |
| 4,641,271 | 2/1987 | Konishi et al. | 414/273 X |
| 4,651,863 | 3/1987 | Reuter et al. | 414/331 X |
| 4,669,047 | 5/1987 | Chucta | 414/331 X |
| 4,692,876 | 9/1987 | Tenma et al. | 364/478 X |
| 4,909,697 | 3/1990 | Bernard, II et al. | 414/331 |
| 5,246,332 | 9/1993 | Bernard, II et al. | 414/786 |

FOREIGN PATENT DOCUMENTS

| | | | |
|---|---|---|---|
| 131845 | 6/1986 | Japan . | |
| 243701 | 10/1986 | Japan | 414/273 |
| 215410 | 9/1987 | Japan | 414/331 |
| 249802 | 10/1987 | Japan | 414/273 |
| 244804 | 10/1987 | Japan | 414/273 |
| 449198 | 4/1968 | Switzerland . | |
| 755693 | 8/1980 | U.S.S.R. . | |
| 2157667 | 10/1985 | United Kingdom . | |

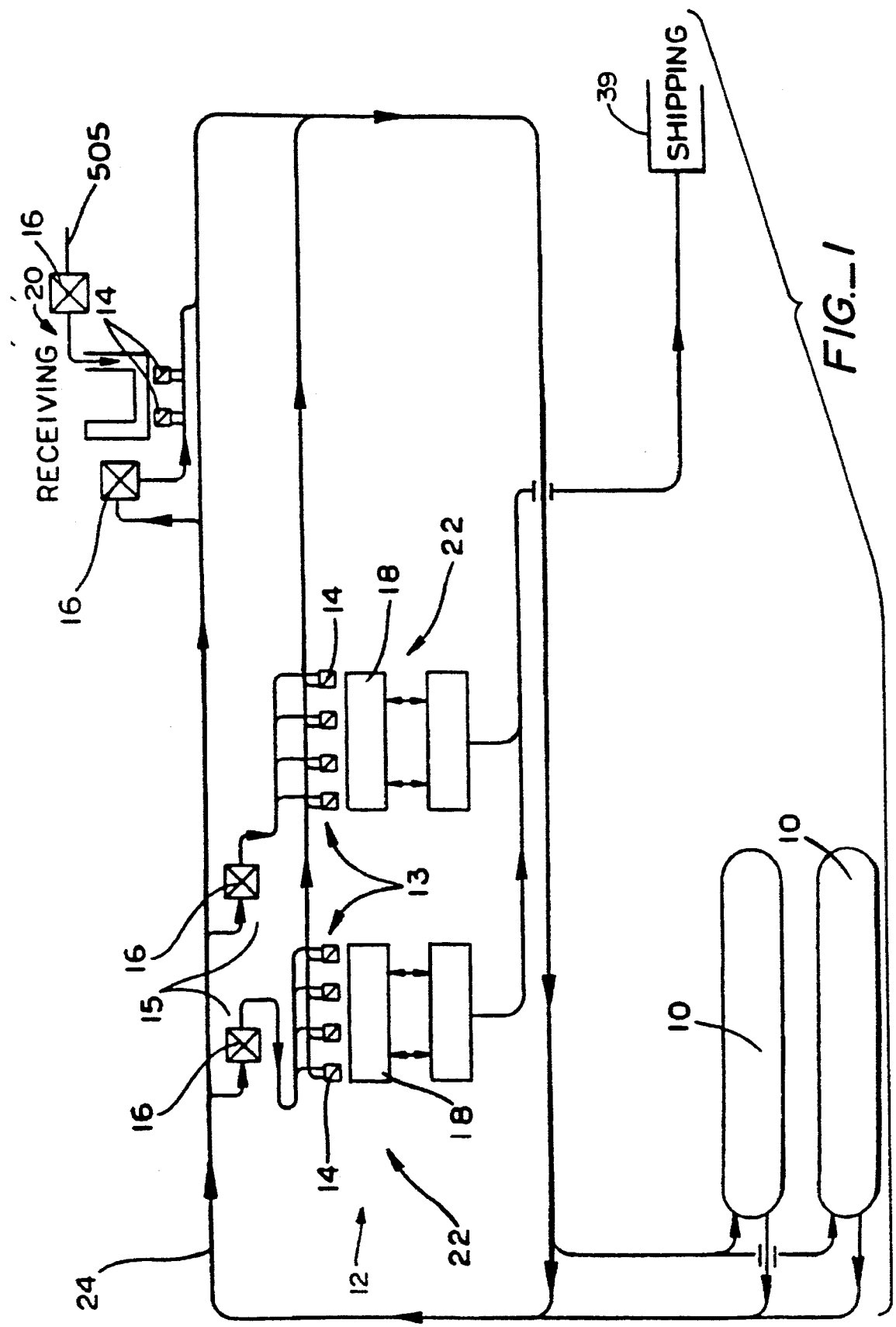
FIG._1

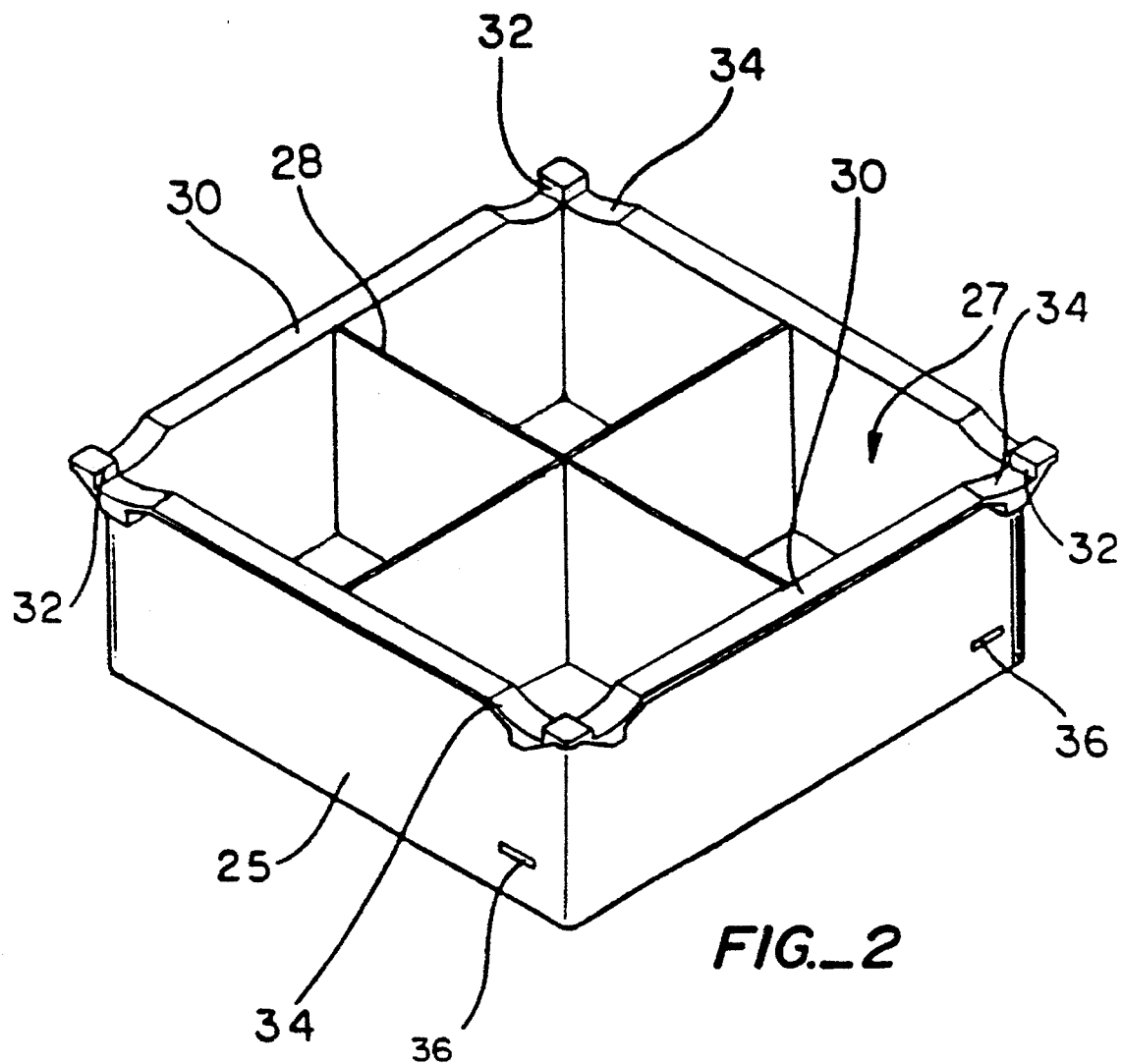
FIG._2

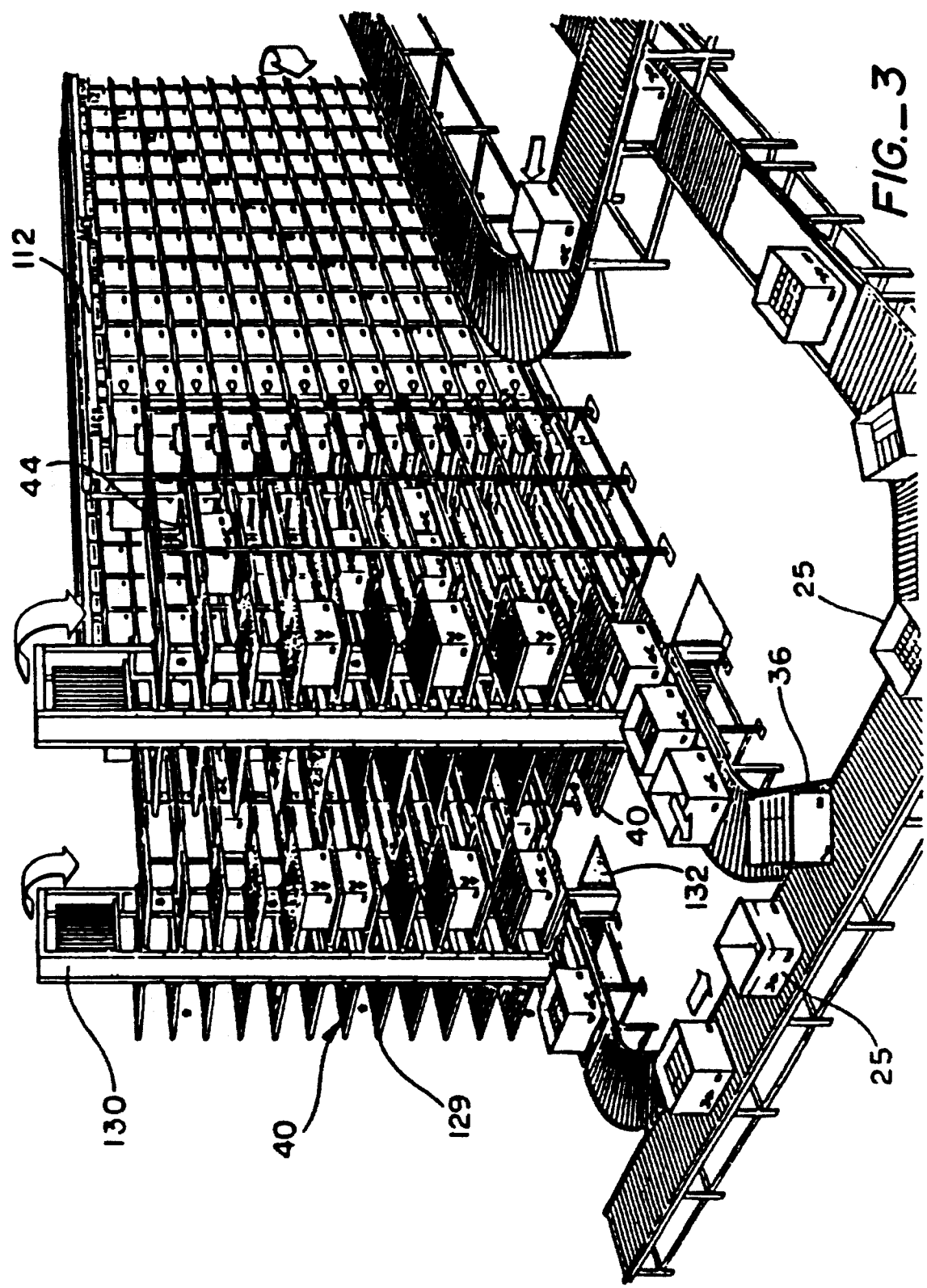

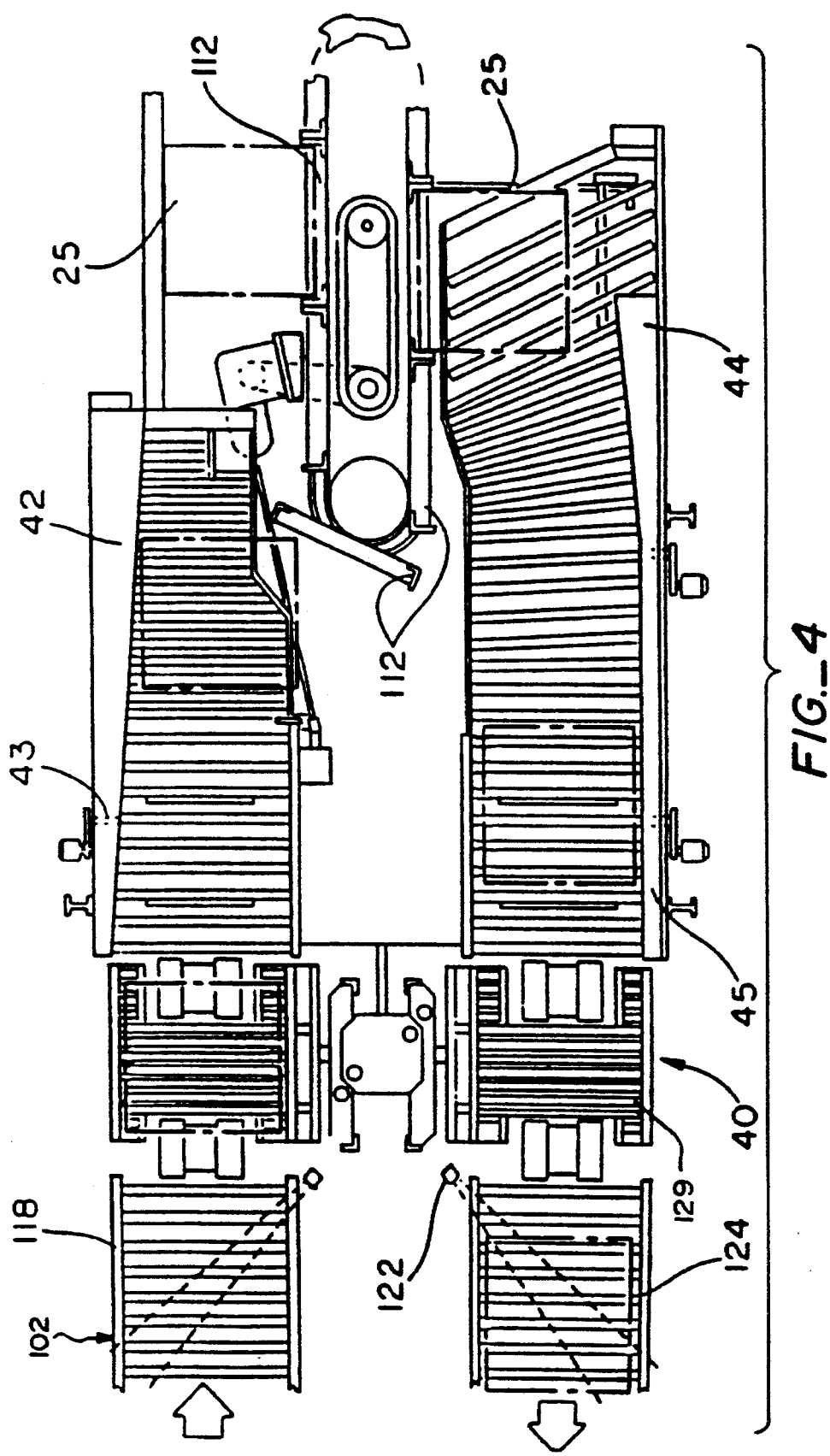
FIG._4

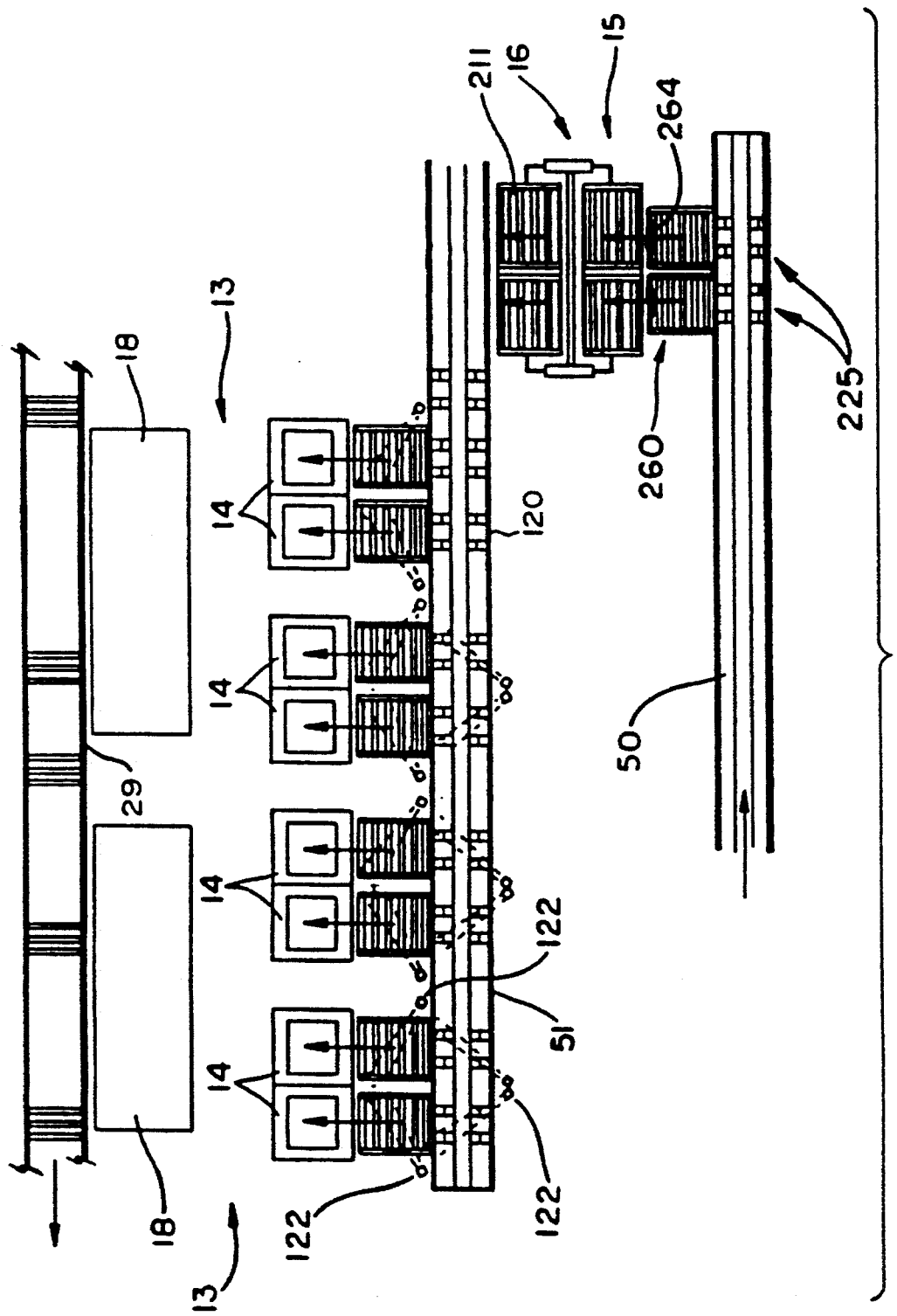
FIG._5

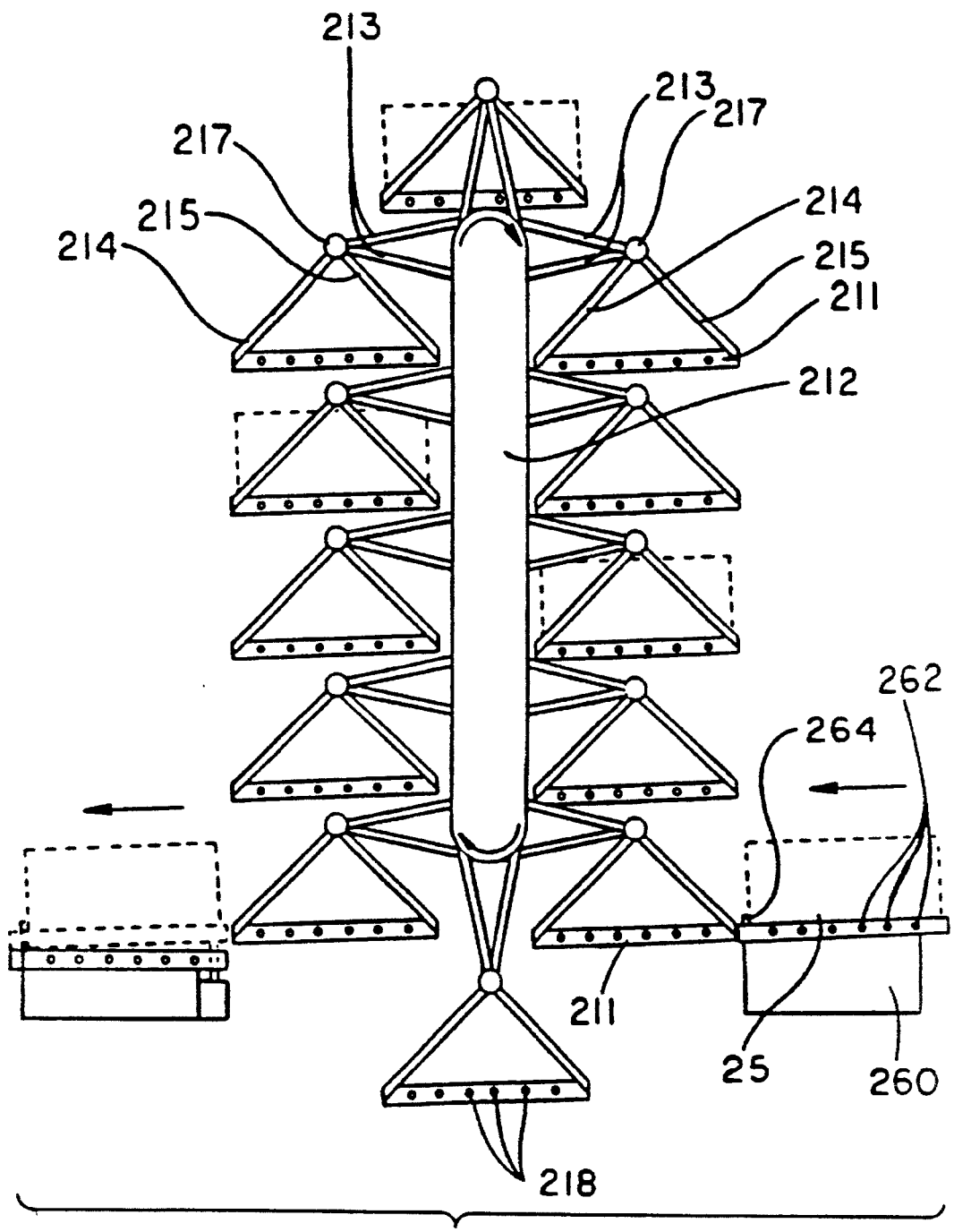
FIG._6

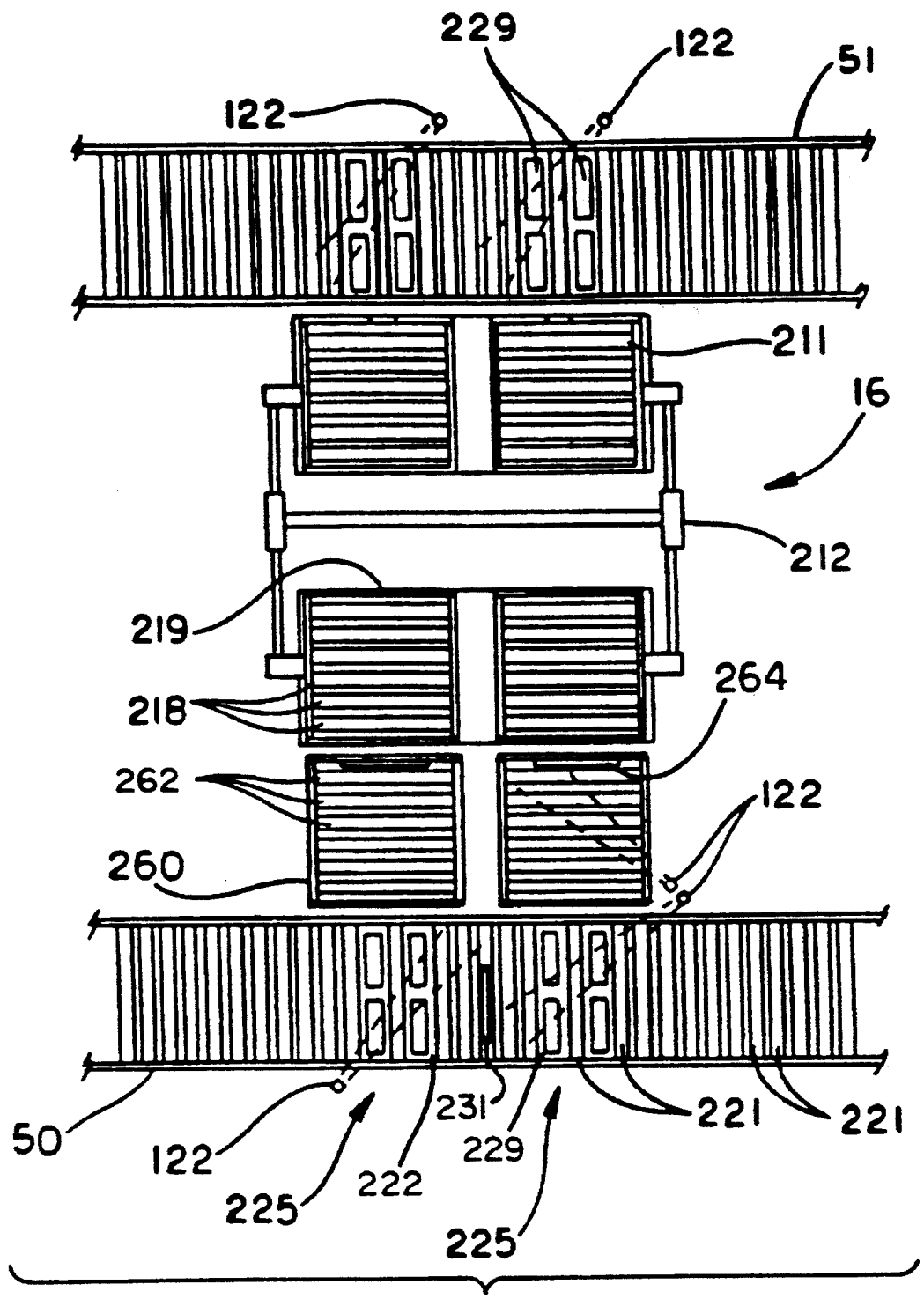
FIG._7

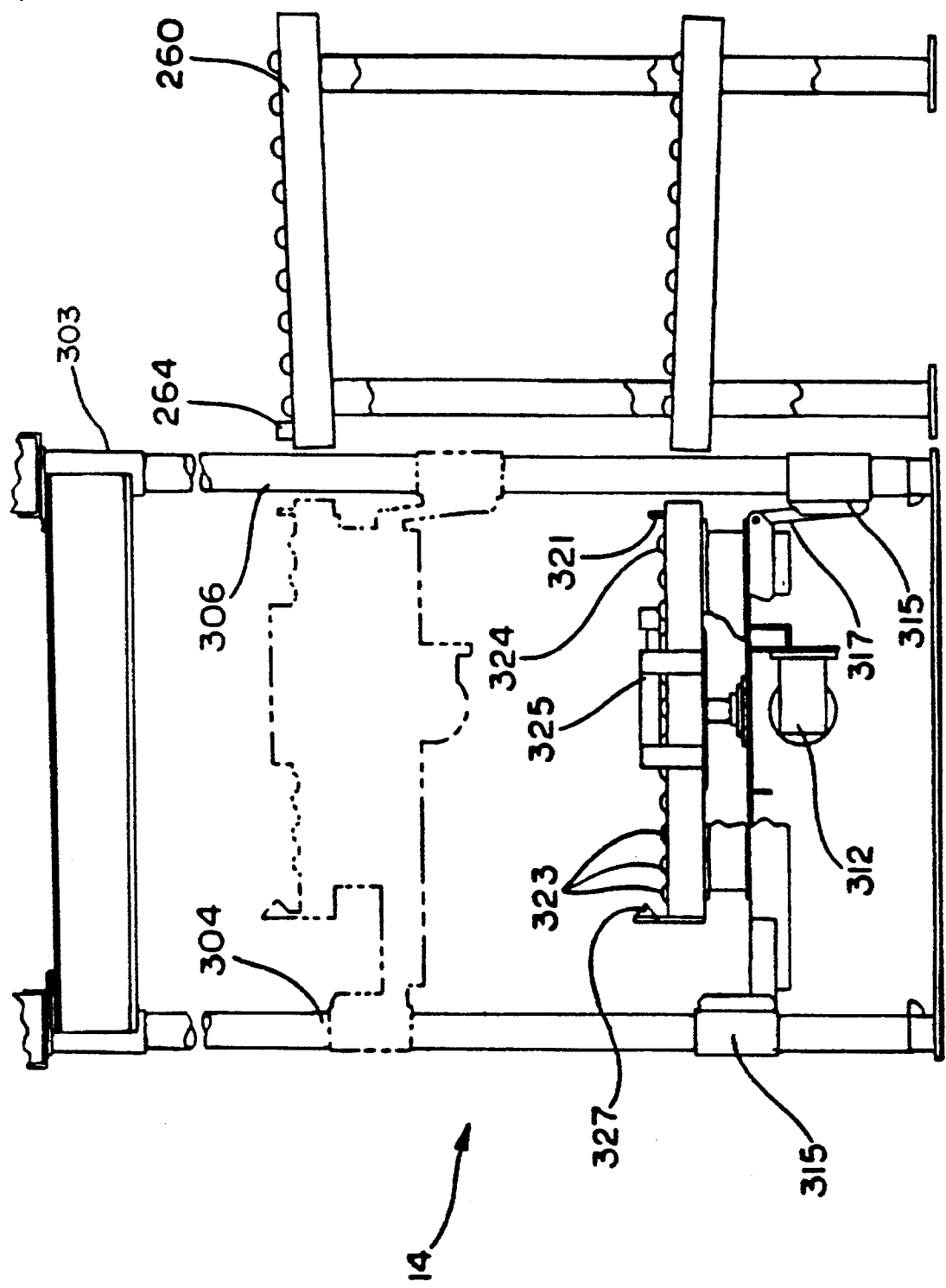

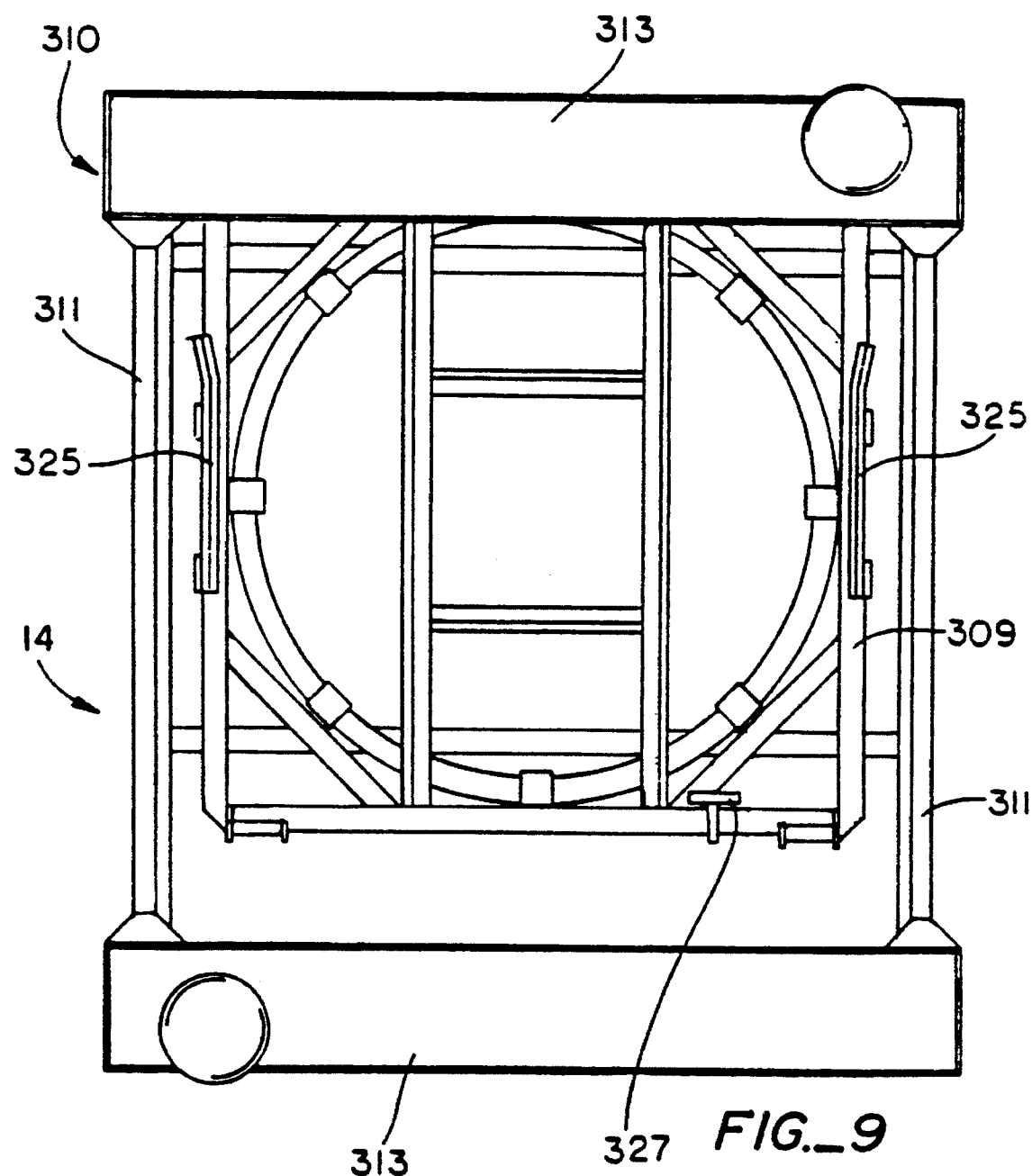
FIG._9

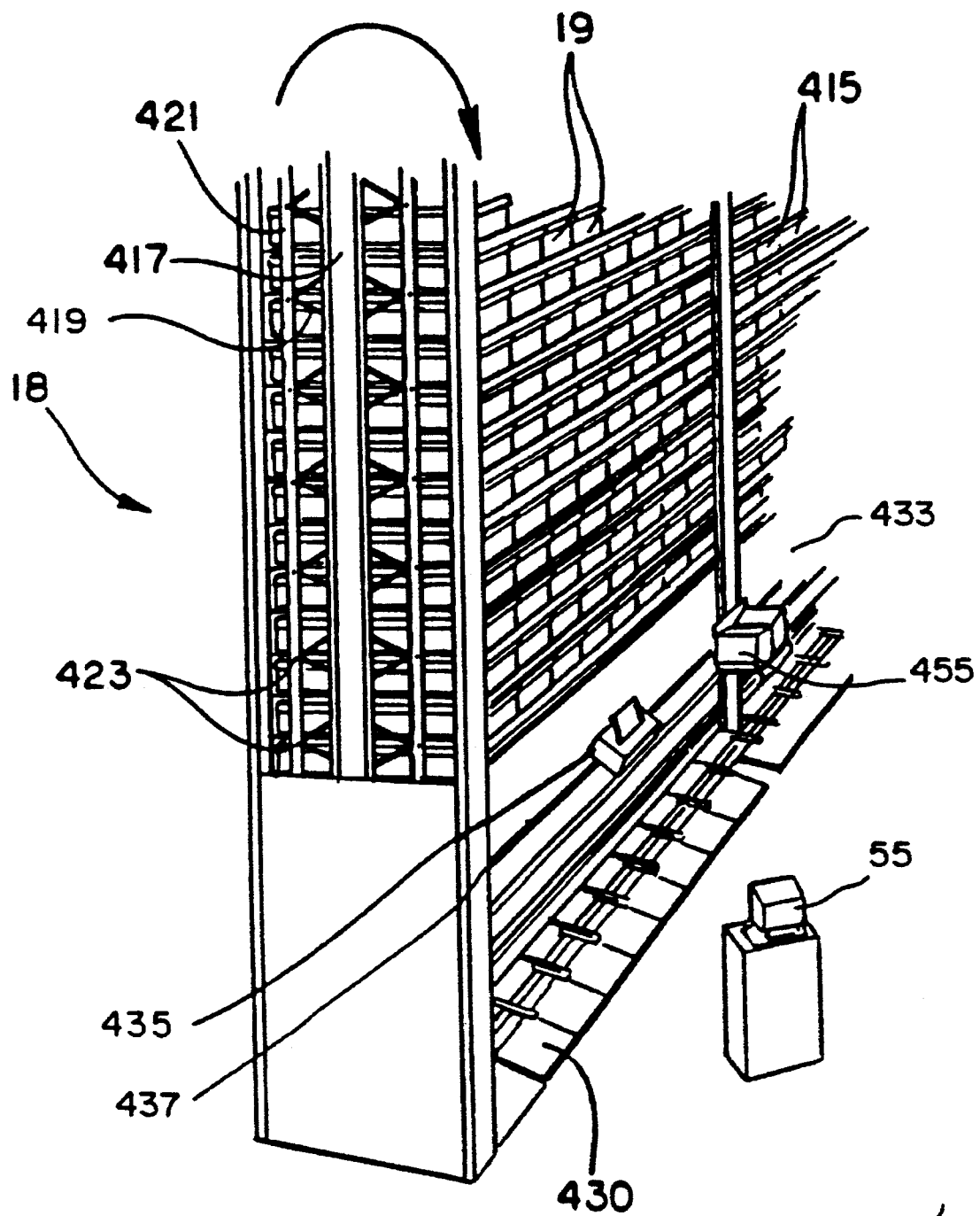
FIG._10

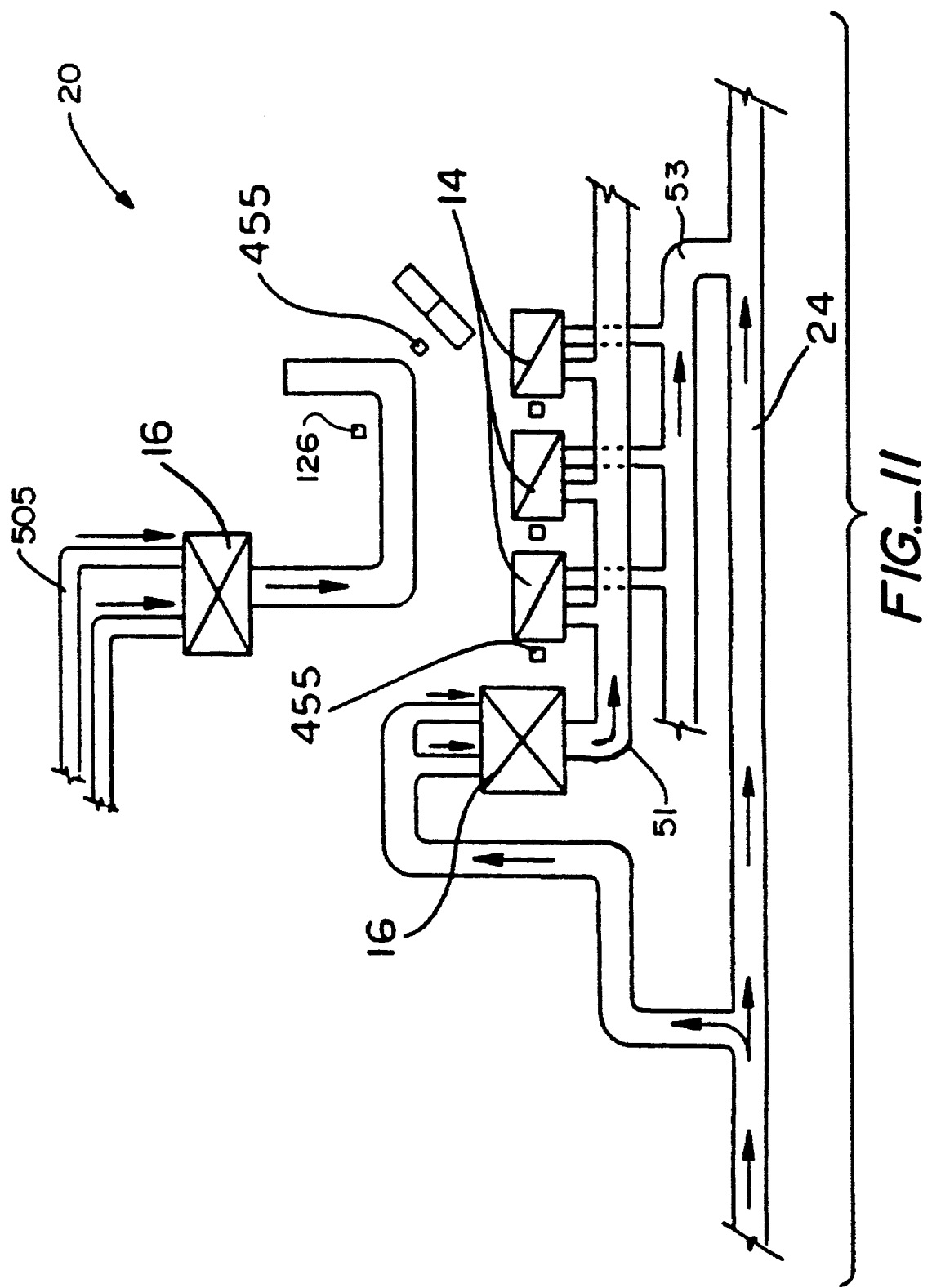
FIG._11

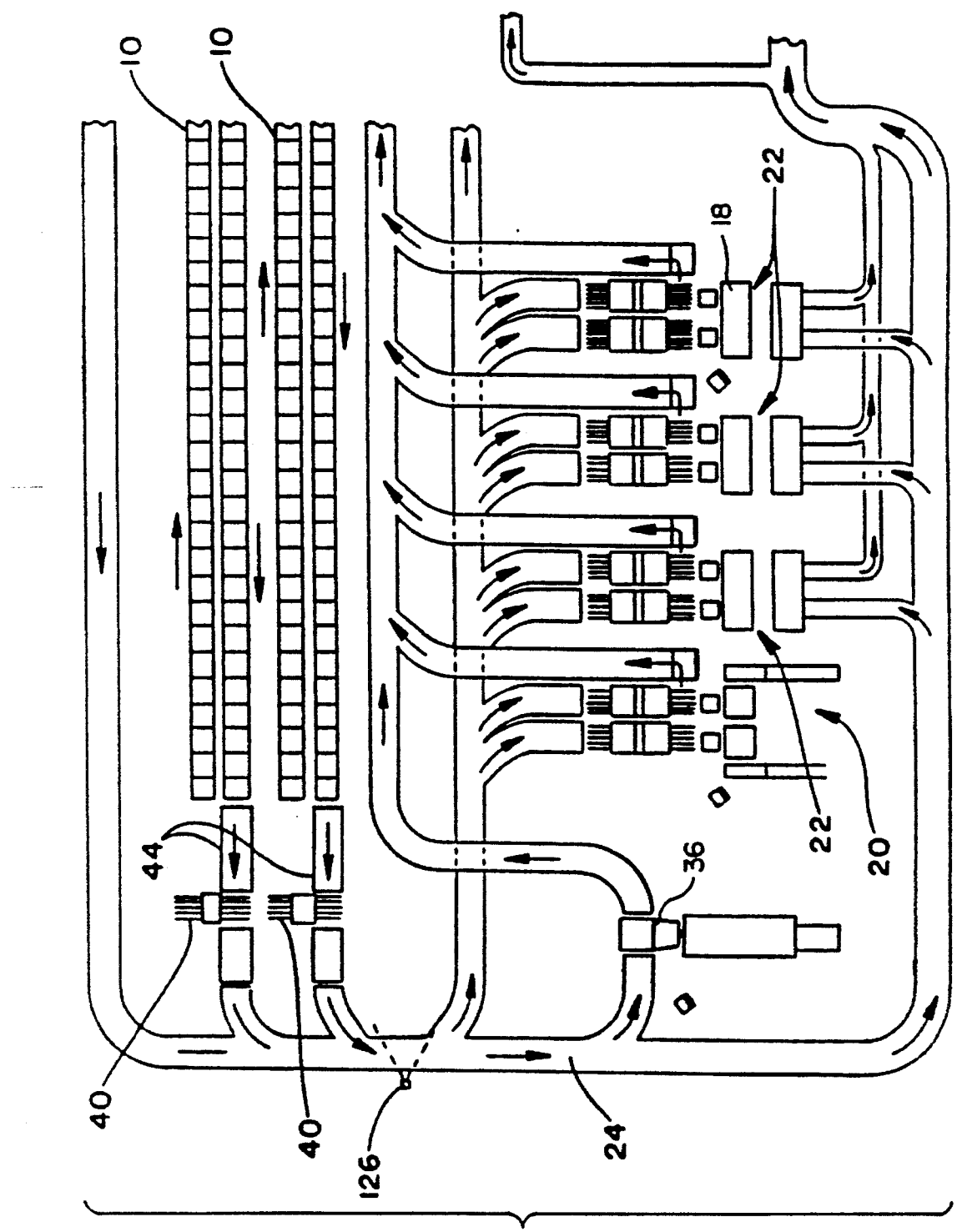
FIG._12A

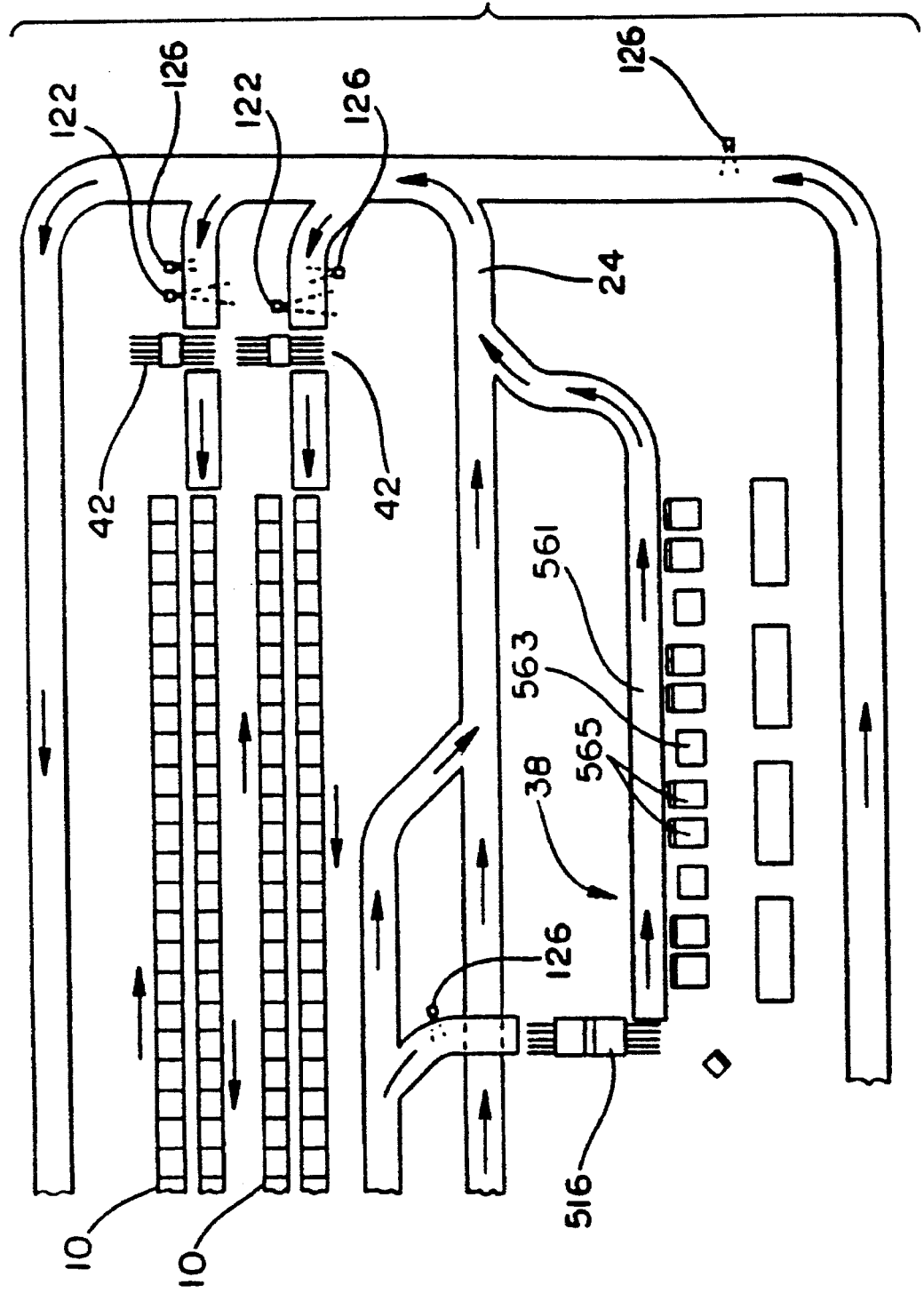

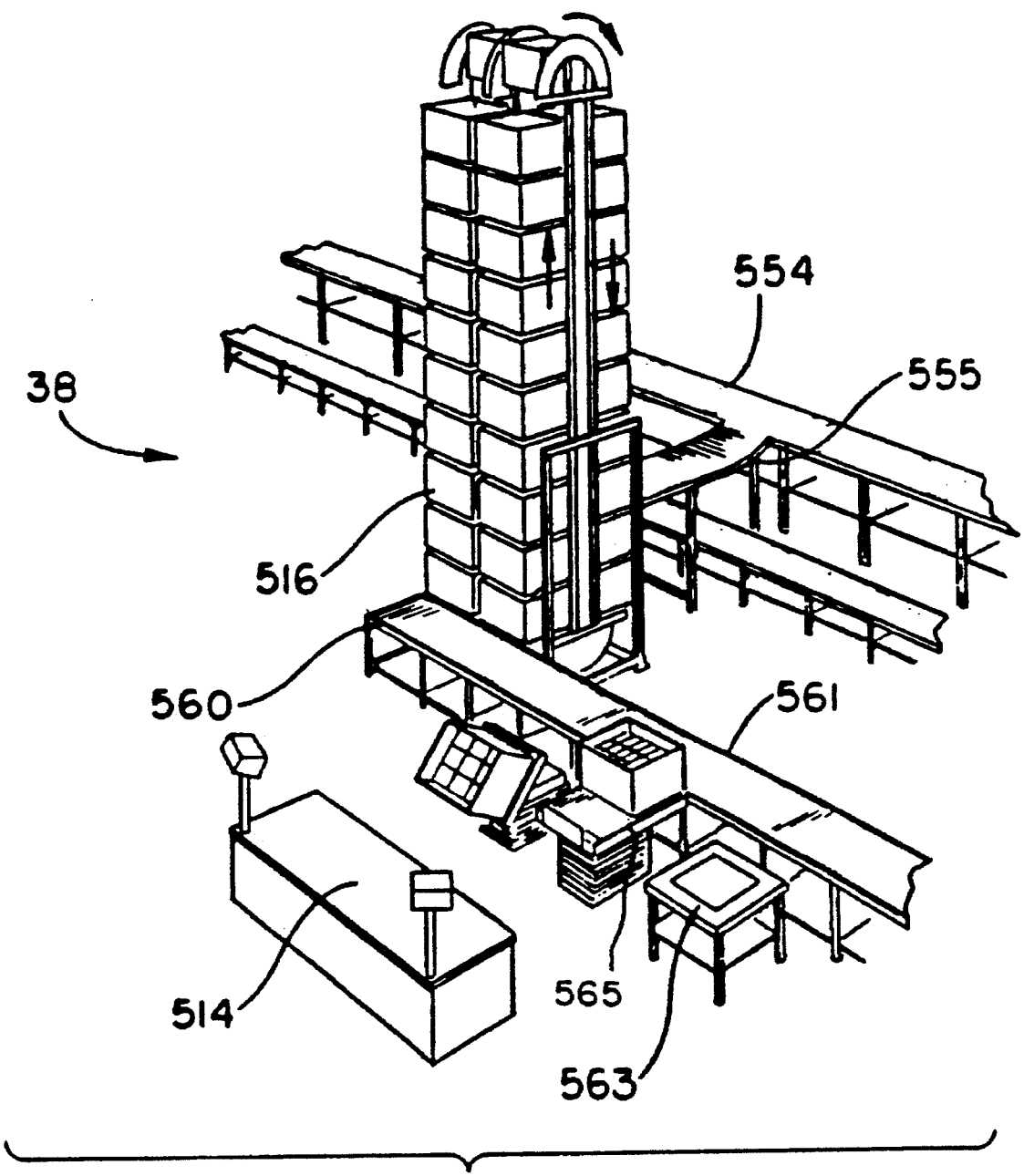
FIG._13

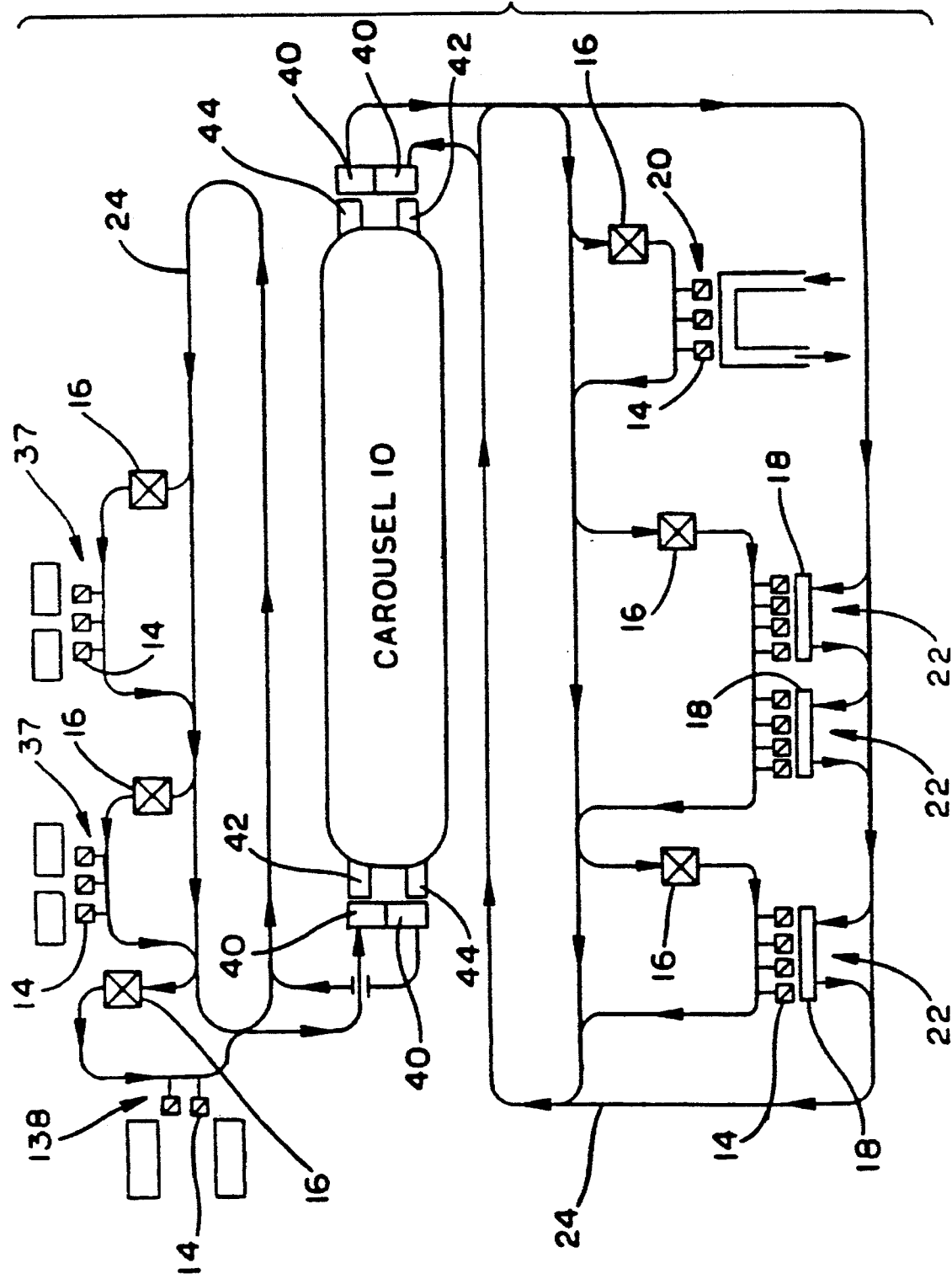

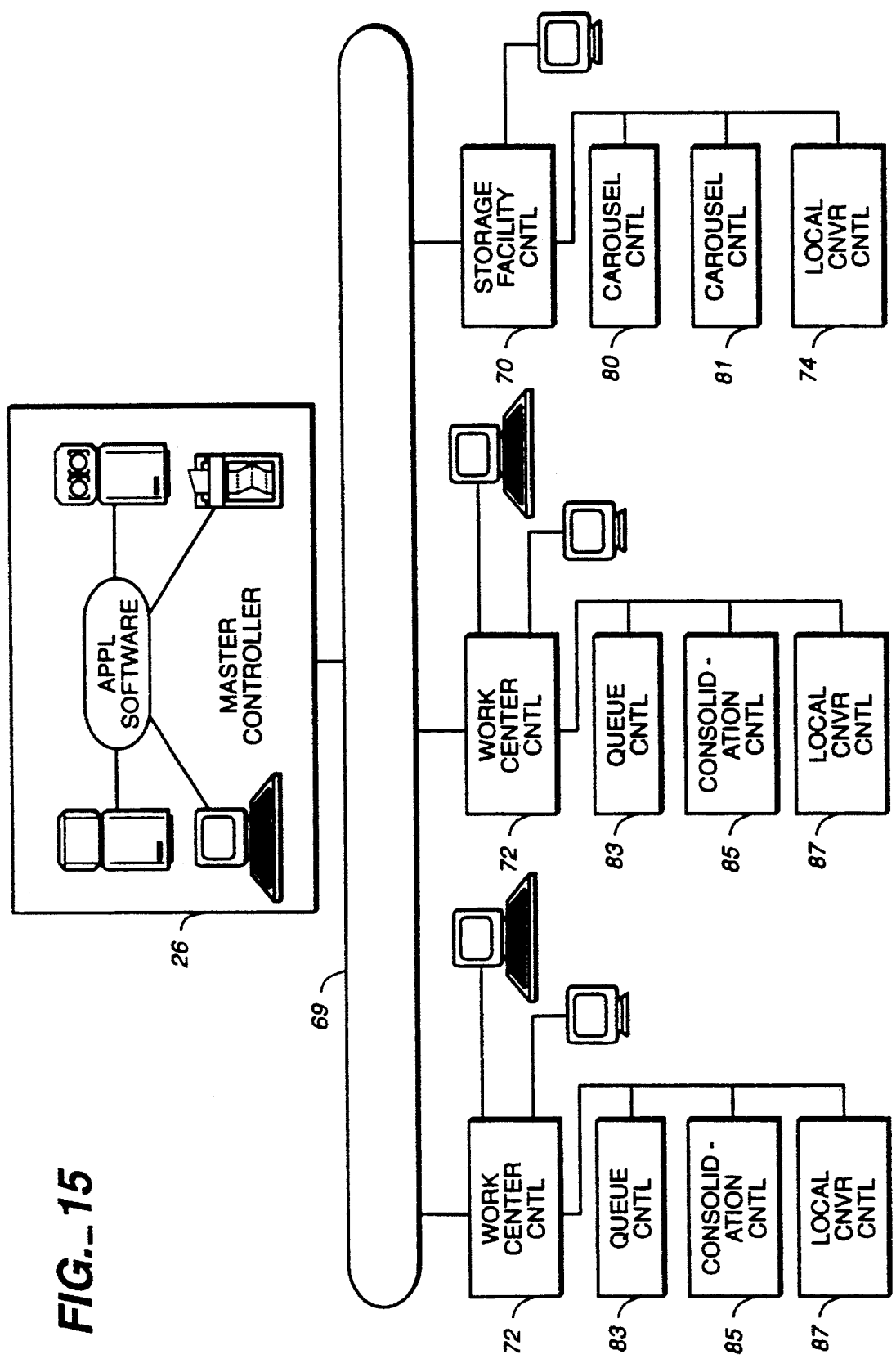
FIG._15

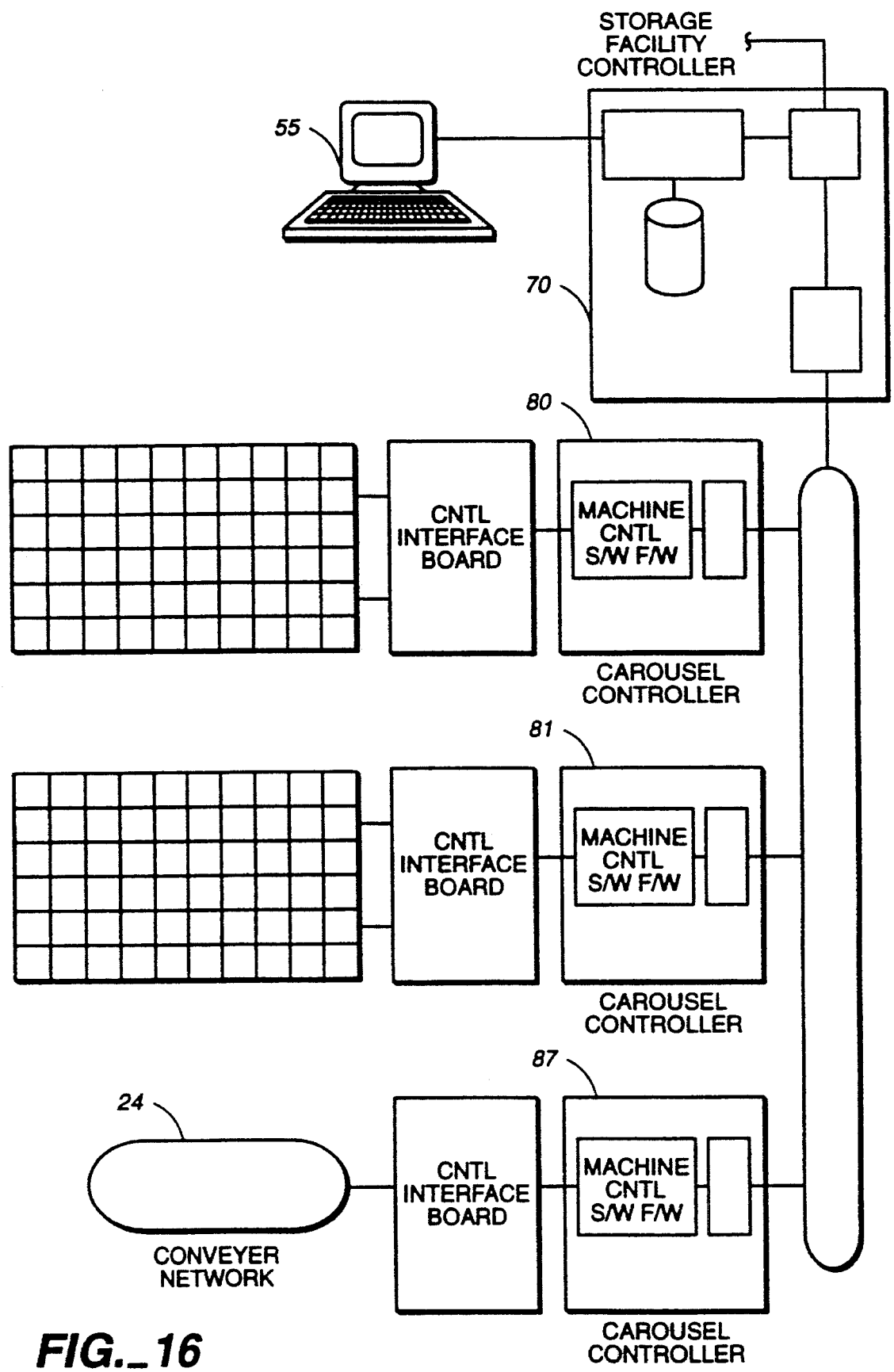
FIG._16

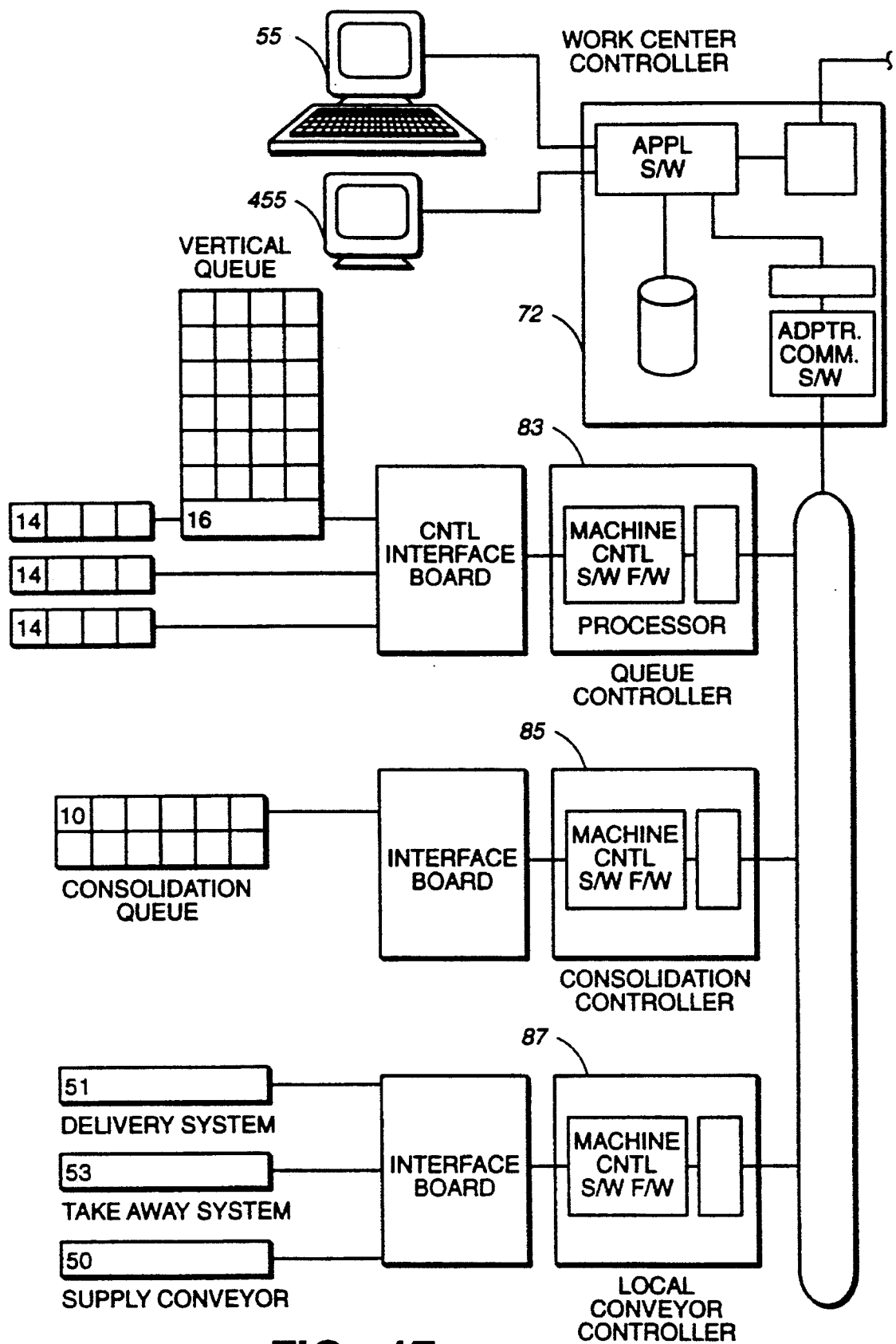
FIG._17

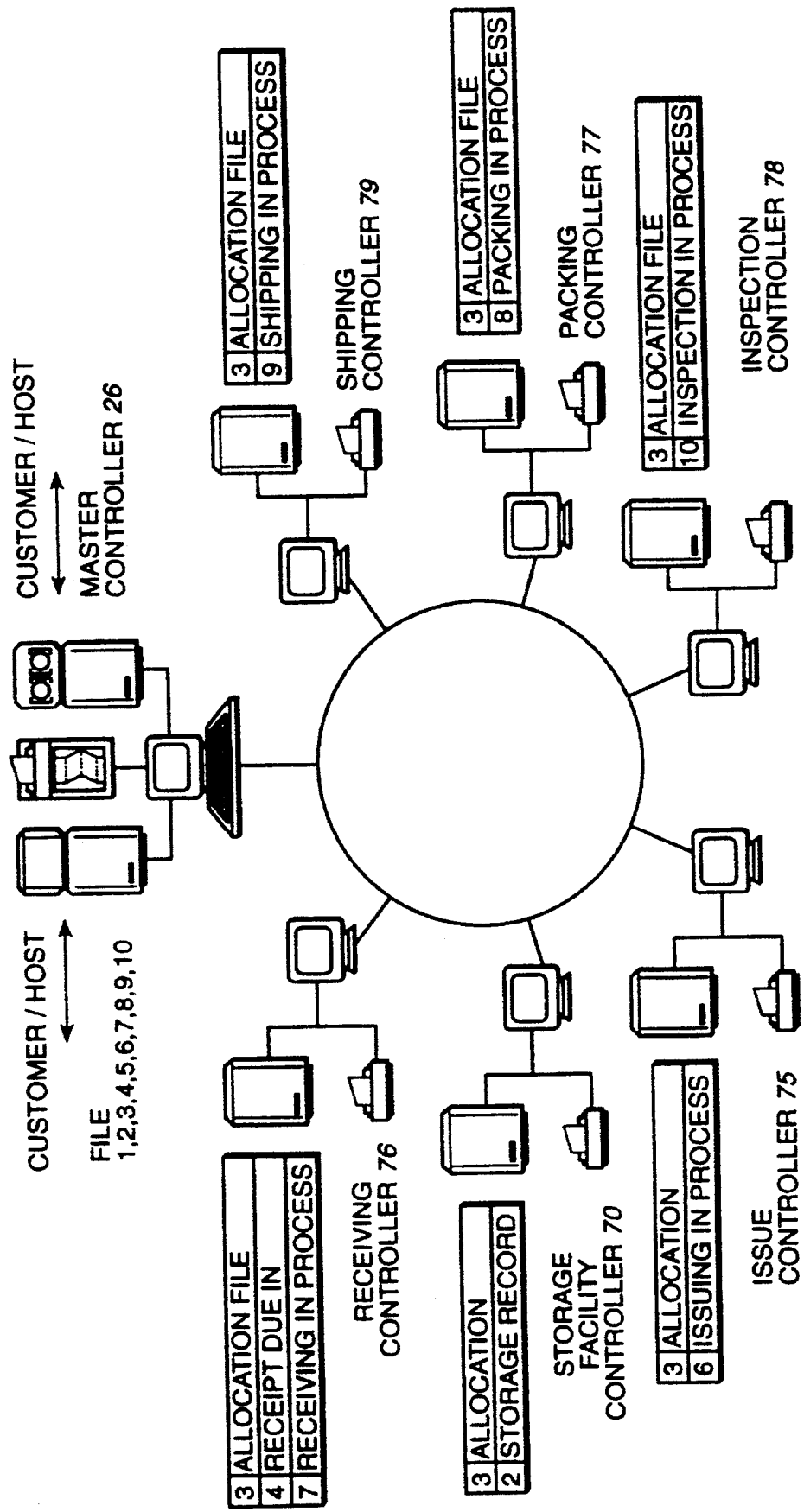
FIG._18

SYSTEM FOR DELIVERY

This application is a continuation of application Ser. No. 08/125,371, filed Sep. 21, 1993, now abandoned; which is a continuation of application Ser. No. 07/712,485, filed Jun. 10, 1991, now U.S. Pat. No. 5,246,332; which is a division of application Ser. No. 568,534, filed Aug. 15, 1990, now U.S. Pat. No. 5,171,120; which is a continuation of application Ser. No. 07/481,719, filed Feb. 16, 1990, now abandoned; which is a continuation of application Ser. No. 07/158,310, filed Feb. 22, 1988, now abandoned; which is a continuation-in-part of the following applications: Ser. No. 06/800,337, filed Nov. 21, 1985, now abandoned, 06/824,718 filed Jan. 31, 1986, now abandoned, 06/815,808, filed Jan. 2, 1986, now abandoned, 07/015,083, filed Feb. 17, 1987, now abandoned, 06/821,257, filed Jan. 22, 1986, now U.S. Pat. No. 4,752,175, and 07/031,989, filed Mar. 30, 1987, now abandoned, which in turn is a continuation-in-part of application Ser. No. 06/732,927, filed May 13, 1985, now abandoned. These applications and the patent are incorporated herein by reference.

Many modern warehouses require the storage and retrieval of thousands of inventoried items. Often the goods must be stored in bins or containers due to their size or delicate construction. Therefore, storage requires loading the containers and delivering the containers to a known location where they can later be retrieved as necessary. When an order is received, the desired items must be retrieved from their respective storage positions and prepared for either shipping or use. An efficient warehousing operation requires the ability to both store and retrieve a wide variety of goods and to rapidly and effectively dispose of the retrieved items. Heretofore, there have been a wide variety of automated warehousing systems that have been proposed to reduce the labor required in warehousing operations.

Conventional storage and retrieval systems utilize large multi-level fixed storage shelves in combination with an extractor or picking mechanism that must travel to a particular shelf to pick the desired inventory item. Such a system is limited to a small number of transactions each time the extractor is operated. The picked goods are then delivered to a work station where packing, delivery and/or use takes place. More recently, storage structures have been proposed that include a moveable multi-leveled storage carousel having a multiple number of stacks of vertically spaced trays arranged to travel about a frame as shown, for example, in U.S. Pat. Nos. 4,561,820, 4,422,554 and 3,780,852.

Many material handling systems incorporate components aimed at improving the efficiency of the operation. For example, U.S. Pat. No. 3,803,556 discloses a conveyor control system for routing tote pans past various divert stations along a conveyor loop. U.S. Pat. No. 3,792,785 discloses an automated freight terminal for sorting, staging and subsequently loading outgoing shipments in a desired sequence.

Integrated warehousing systems have also been contemplated. For example, Japanese Application No. 53-37829 discloses a method for assorting goods that are stored on storage shelves. The system contemplates removing boxes containing ordered goods from a storage shelf onto a loop-type conveyor which transfers the boxes to a branch line wherein they are reviewed by an operator. The operator looks at the goods in the box and then identifies a customer who needs such goods. He then drives a loop type conveyor to bring a container before him into which the ordered goods may be placed. However, such a system has significant delay times since it is not fully automated and the equipment provided is not organized to maximize efficiency. Although the systems heretofore available have greatly increased the speed and effectiveness of material handling, they still lack the ability to coordinate warehousing activities fast enough to meet current demand in numerous applications.

A typical example may be an electronic product manufacturing and/or repair facility wherein the products built incorporate printed circuit boards. Such warehousing applications may require storage of as many as 150,000 components the vast majority of which would fit into 6"×6"×18" compartments. In any given day as many as 1500 assorted components may be drawn from the storage facility. In the environment of a repair facility, there must also be an effective mechanism for storing items that cannot be repaired using parts in stock while the unavailable parts are on order. Absent effective integration of the storage system and the repair or manufacturing facilities, the combined man hours lost between delivering the goods to the appropriate work station and the downtime at various work stations as they wait for supplies would become prohibitive.

Another typical example is a consumer products and pharmaceutical warehousing system where on the order of 25,000 stock items must be stored in both case lots and piece lots. The individual stock items may range in size anywhere between 1"×1"×1" to 36"×36"×18". A representative warehouse may have on the order of 800 customers with in the range of 400 to 800 customers placing orders on any given day. The orders may call for as many as 60,000 individual stock units and the actual number of items requested for each particular stock unit may widely vary. Additionally, rather than sending each customer a truckload randomly containing the ordered goods, At is desirable to package the ordered goods for each customer in smaller lots of related goods. For example, in the consumer products and pharmaceutical application described, related families of products might include RX, hair care products, etc. This allows rapid restocking when the totes are delivered to the retail store.

In any warehousing system, it is desirable to keep very good records of the inventory and the pending orders so that an appropriate amount of inventory may be kept on hand. In this connection there is a need to have a constant record kept of the location of containers loaded onto the storage rack. Similarly, records must be kept as to the actual material goods stored within each container so that the goods can be accessed when needed.

One of the most time consuming and expensive aspects of typical warehousing operations is the need to replenish stocks. Depending upon the nature of the warehousing system in use, replenishment is typically accommodated by either delivering additional stock to the fixed .storage location or bringing a container holding the goods to be replenished to a receiving station wherein additional items are added. Such operations are typically very labor intensive.

Therefore, it is a primary objective of the present invention to provide a new and improved system for storage, retrieval, handling and disposition of items in great quantity and variety from a storage conveyor of great capacity wherein automatic handling of the objects is maximized while the required manual operations are minimized.

Another object of the invention is to provide a new and improved system for handling items from a multi-level automated storage conveyor wherein a variety of different types of work stations are possible within a single conveyor array.

Another object is to provide flexibility and variation in the number and variety of work stations associated with a storage structure to meet varied individual demands.

Another object of the invention is to provide a warehousing system where temporary storage facilities are associated with various work stations to queue inventoried items for delivery to the work area.

Another object of the invention is to provide a modular warehousing control system capable of efficiently and automatically coordinating the delivery of containers to the work area to maximize operator efficiency.

Another object of the invention is to provide an efficient warehousing system for consolidating a wide range of variable orders using minimal manual labor.

To achieve the foregoing and other objects and in accordance with the purpose of the present invention, an automated warehousing system is provided for receipt, storage and disposition of a wide variety of material items. The warehousing system includes a multiplicity of containers for receiving different quantities and varieties of the material items. A container storage means is provided for storing the containers. The storage means includes a rotational storage carousel having a multiplicity of connected container support rack arrays together with means forming a horizontal continuous track and means for moving the container support rack arrays about the continuous track. The support rack arrays are arranged in side by side fashion with each array including a plurality of vertically spaced container racks. Each rack is suitable for carrying a container. A loading means is provided for selectively inserting and extracting the containers from the support racks.

A work center is provided for selectively adding or withdrawing items from the containers. The work center includes a work area for providing an operator access to the containers and a temporary storage queue receiving and temporarily storing a plurality of selected containers prior to delivery to the work area. The temporary storage queue is randomly accessible so that at any given time, it may discretely provide the work area with any one of the containers stored thereon.

A conveyor network is provided for delivering selected containers from the storage carousel to the work center and a control means for coordinating the automated aspects of the warehousing system. Specifically, the control means coordinates the insertion and extraction of selected containers from the storage carousel, movement of containers between the storage carousel and the work center, and movement of containers between the temporary storage queue and the work table.

In one of the preferred embodiments, a plurality of work centers are provided and each work area includes a plurality of work tables. Further, each work center includes delivery means for transporting selected containers between the temporary storage queue and the work tables and a takeaway means for transporting selected containers from the work tables to the conveyor network.

In another preferred embodiment of the invention, the plurality of work centers includes at least one issue station which further includes a consolidation queue having a plurality of tote drawers adapted to receive material items carried by the containers.

In another preferred embodiment, the control means includes a storage facility controller for managing the activities of the storage structure and the loading means and a work center controller for managing the activities of the work center. The storage facility controller causes the containers to be randomly positioned on the storage structure and remembers the rack position at which each container is stored in the storage structure.

In a preferred control aspect of the invention, the work center controller creates and periodically updates an acceptable container last indicative of containers expected to be required by the work center. When the work center is prepared to receive one or more additional containers, the acceptable container list along with a designation of the number of containers presently desired is sent to the storage facility controller which selects the specific containers to be delivered to the work center from the acceptable container list based, at least in part, on the expected efficiency of extraction from the storage structure.

The features of the present invention that are believed to be novel are set forth with particularity in the appended claims. The invention, together with further objects and advantages thereof, may best be understood by reference to the following description taken in conjunction with the accompanying drawings in which:

FIG. 1 is a floor plan of a warehousing system in accordance with the present invention showing the identity and relative location of the operational parts of the system.

FIG. 2 is a perspective view of a container suitable for use with the system shown in FIG. 1.

FIG. 3 is a perspective view of a typical multi-level storage carousel with insertion and extraction assemblies.

FIG. 4 is a diagrammatic plan view of the mechanisms for inserting and extracting containers from a single level of the storage carousel.

FIG. 5 is a top plan view of an issue station layout.

FIG. 6 is a side view of a typical vertical queue as shown in FIG. 5.

FIG. 7 is a top view of the vertical queue shown in FIG. 6.

FIG. 8 is a side view of a typical rotating work table as shown in FIG. 5.

FIG. 9 is a top view of the platform for the work table shown in FIG. 8.

FIG. 10 is a perspective view of a typical consolidation queue as shown in FIG. 1.

FIG. 11 is a top plan view of a receiving station layout.

FIGS. 12A and 12B are a floor plan for an alternative embodiment of the warehousing system of the present invention.

FIG. 13 is a perspective view of a typical pack/wrap station as shown in FIG. 12.

FIG. 14 is a floor plan of yet another alternative embodiment of the present invention adapted for use in a production facility.

FIG. 15 is a schematic block diagram of a controller architecture suitable for use with the embodiment shown in FIG. 1.

FIG. 16 is a block diagram of a representative storage facility control system.

FIG. 17 is a block diagram of a representative work center control system.

FIG. 18 is a schematic block diagram of a controller architecture suitable for use with the embodiment shown in FIG. 12.

DETAILED DESCRIPTION OF A PREFERRED EMBODIMENT

The warehousing system of the present invention is comprised of a plurality of independent stations each of which accomplish a particular task. It is contemplated that the actual sizes of the various stations may be widely varied to suit the needs of a particular warehousing application. Similarly, it is contemplated that each station may be designed as a functional unit and that multiple units of a particular station may be incorporated into a particular warehousing application.

Components suitable for use in conjunction with the system described are the subject of several applications and two U.S. patents, including application Ser. Nos. 031,989 filed Mar. 30, 1987, now abandoned; 732,927 filed May 13, 1985, now abandoned; 824,718 filed Jan. 31, 1986, now U.S. Pat. No. 4,752,175, issued Jun. 21, 1988; 815,808 filed Jan. 2, 1986, now abandoned; 015,083 filed Feb. 17, 1987, now abandoned; and U.S. Pat. No. 4,968,207, issued Nov. 6, 1990. Each of these applications and patents is incorporated herein by reference.

Referring initially to FIG. 1, a small scale embodiment of the warehousing system of the present invention that has been chosen for illustrative purposes includes a pair of horizontal multi-level storage carousels 10, and a plurality of work centers 12. Each work center 12 has a work area 13 which includes a plurality of work tables 14, and a temporary storage queue 15 that may take the form of a vertical queue 16. The system is designed so that any particular work center may be arranged as a receiving station 20, an issue station 22 or a production supply station. Conceptually, the receiving station would facilitate introduction of goods into the warehousing system. The issue station would facilitate consolidating orders for inventoried goods into totes or containers suitable for shipping to a customer and includes a consolidation queue 18 adapted to receive a multiplicity of totes to facilitate the coordination of orders. The production supply station would support either the manufacturing or repair of various products. Goods stored in the warehousing system are placed within containers 25 which may be transported between the various stations on an extended conveyor network 24. Each station has an independent controller while a master controller 26 (FIG. 15) coordinates the activities of the various stations.

The delivery system could alternatively be configured to include Pack/Wrap work stations, shipping work stations, or other types of work stations configured to accommodate a particular task.

The containers 25 are preferably open boxes that are sized appropriately to receive the stored goods. A representative container 25 is shown in FIG. 2. In the embodiment described, the containers 25 are adapted to be hung on racks carried by the storage carousel 10. The containers are preferably square so that they may be hung from the racks in any orientation and they are sized to suit the needs of the particular storage application. The containers must be large enough to hold reasonable quantities of the inventoried goods, yet they must be small enough so that an operator can readily pack the goods therefrom. By way of example, 36×36×24 inch containers are suitable for most consumer product applications. In applications where extremely small parts or small numbers of each item are inventoried, smaller containers on the order of 24×24×16 would be appropriate.

The containers 25 may be formed from a molded fiberglass reinforced resin material. As seen in FIG. 2, a suitable container 25 includes an upper rim 30 having a pair of shoulders 32 formed at each of its upper corners. The shoulders 32 are formed by a gradual depression 34 in the upper rim 30. The shoulder arrangement lends itself to what may be described as a cantilevered support by the rotational Storage structure as described below and as disclosed in U.S. Pat. No. 4,968,207, issued Nov. 6,1990.

Each container has an identification indicia 36 that individually identifies the particular container. By way of example, the containers may be numbered sequentially with the numbers being applied in bar coded form to each exterior corner of the container. Bar code labels may be readily printed and adhered to the container corners. It is desirable to label each corner so that a single scanner can identify the container regardless of its orientation as it passes the scanner. With larger containers it may also be desirable to control the orientation of the container when it is presented to an operator. In such systems, the bar code labels could further identify each particular corner.

In place of the described containers, a support pin or frame could be provided which includes the described attachment mechanisms. In such a system boxes and/or containers could be placed into the support pin for use within the warehousing system.

In most warehousing operations, the sizes of the stored goods will vary widely. Thus, for compatibility relatively large containers are used so that only one or two container sizes need be handled by the warehousing system. To minimize the empty shelf space, many of the containers would be subdivided into multiple compartments 27 by placing wall inserts 28 into the containers. Generally, there would be containers having a wide range of compartment sizes within the warehousing system, with the actual number of containers having a given compartment size being entirely dependant upon the nature of the goods being stored. To maximize flexibility, wall inserts 28 may be removable so that the number of compartments within any container may be readily altered. To facilitate automatic control, each compartment 27 has a specific designation within the container 25.

Storage Carousel

Referring next to FIG. 3, each rotational storage carousel 10 forms a horizontally traveling endless conveyor that carries a plurality of racks 112 for supporting the containers 25 about an oval track. It will be appreciated that, space permitting, there can be virtually any number of conveyor racks 112 in side by side relationship and also that racks can be arranged in tiers, one above the other, as suggested in FIG. 3. The racks 112 are parallel to each other and racks in the various tiers are aligned perpendicularly with respect to the ground.

A suitable frame structure is provided to support the multiple tiers of storage racks. Each storage carousel includes an upper track and a matching lower track. The tracks for each carousel are identical and continuous, oval-like in shape with rounded ends and parallel sides. The racks are moved along the tracks by an electrically, hydraulically, or pneumatically operated motor (not shown). For a more detailed understanding of how a suitable rotating storage carousel may be constructed, reference is made to an acceptable structure as disclosed in U.S. Pat. No. 4,422,554.

At one end of the storage carousel 10, a lift 40 is provided for carrying containers to and from each of the rack tiers. Referring also to FIG. 4, each tier has an associated inserter assembly 42 and an extractor assembly 44. As seen in FIGS. 3 and 4, the insertion and extraction may all take place on one end of the storage carousel. However, it should be appreciated that if demand is expected to be particularly heavy, higher picking volumes can be attained by adding additional inserters and/or extractors to the opposite end of the carousel or at intermediate points.

The lift 40 is adapted to deliver containers to the inserters and carry extracted containers to the conveyor network. The lift is contained by a frame 130 that rides on a base (not shown). The frame stands over a pit 132 below the supporting surface of the base. A plurality of platforms 129 are arranged about a chain (not shown) to travel vertically in an endless loop. The platforms are evenly spaced about the chain at intervals equal to the distance between tiers on the storage carousel. With such a construction, the lift may be stopped with each of the platforms 129 on an up travel reach positioned to deliver a container to an inserter, while platforms on the down travel reach are positioned to receive containers from the extractor.

It is significant to note that in the embodiment shown, the containers 25 are adapted to travel on the platforms 129 only throughout the respective up travel and down travel reaches but are not carried over from one reach to the other at either the top or the bottom of the lift. Clearance at the bottom is provided by the pit 132. It will be appreciated, however, that the clearance could be provided in many other ways as well.

As the containers 25 are delivered to the storage carousel 10 by the supply conveyor 118, they are first passed through one or more holding stations 102 before being delivered to a platform 129 on lift 40. The purpose of the holding stations are essentially to act as a queue for temporarily holding containers until an empty platform is positioned adjacent the final holding station and ready to receive the container located thereon. Additional holding stations would in effect serve as an extension for the "queue" since containers would be delivered at random time intervals for insertion onto the storage carousel.

Once a container is loaded onto a platform, it is elevated to the appropriate tier and off-loaded onto the inserter assembly. There are a wide variety of suitable lift constructions. For a more detailed description of suitable lift constructions see co-pending application Ser. Nos. 824,718 filed Jan. 31, 1986, and 821,257 filed Jan. 20, 1986.

Within the inserter assembly 42, the container waits in holding area 43 for an available empty rack to pass by. When the rack passes, the container is moved forward within the inserter assembly synchronously with the empty rack and attached to the rack without requiring the carousel to stop or even slow down. As with the lift, the specific construction of both the inserter end the extractor could take several forms. For details of suitable inserter and extractor constructions see co-pending application Ser. Nos. 031,989 filed Mar. 30, 1987 and U.S. Pat. No. 4,968,207, issued Nov. 6, 1990.

When a request is placed for a particular container, the extractor assembly waits until the rack 112 that holds the desired container passes by. As the rack passes, the container is detached from the rack and pulled into the extractor assembly 44. The container As maintained within the extractor assembly 44 in a holding area 45 until a suitable opening occurs on a platform (which will be moving along a down travel reach), and the container can be moved onto the lift 40. The lift carries the container to a takeaway conveyor 124 which carries the container to conveyor network 24.

Scanners 122 may be positioned throughout the system to detect the presence or absence of containers at each critical position. For example, scanners would be desirable within each of the holding stations, and at each tier level of the lift (preferably on both its up travel and down travel reaches). The scanners would thus provide the system controller with important feedback as to the position of the containers it controls. It will be appreciated, for example, that if a particular lift platform 129, holding station 120, inserter assembly 42 or extractor assembly 44 is full, then the system must be disabled to the extent that no other containers will be directed towards that particular unit until it has sufficient room. Thus, the scanners 122 may be used to monitor the occupancy of the various units.

One or more identification scanners 126 (See e.g., FIGS. 12a and 12b) may also be disposed throughout the system to read the identifying indicia 36 from the side of the container. Specifically, it is desirable to identify the containers as they approach the storage carousel since they are likely to be delivered to the carousel on a random basis. Further, it is preferable to have scanners positioned just before each extractor assembly to verify that a specific container is actually positioned on the rack it is expected on prior to extraction.

Work Center

Depending on the nature of the delivery system, the actual construction of the work centers may vary greatly. For example, in warehousing applications, the work centers would function to issue and receive inventoried items. A receiving station functions quite simply. Specifically, goods brought into the system are placed into containers 25 by an operator. The operator works with a scanner to indicate to a master controller, the identity and number of goods entered into each container, as well as the location (compartment) wherein the goods are placed. It should be appreciated that the operators work could be fully automated without departing from the spirit of the invention.

An issue station functions to consolidate orders. Although the actual construction of the issue station may vary a great deal within the scope of the invention, the described embodiment of the issue work station contains a consolidation queue 18 holding a large number of tote drawers 19 (FIG. 10). A particular customer order may request several items. Thus, when the operator receives the first one of the ordered goods, he would place those goods in a tote drawer associated with the order. As the remaining goods are received, they would be placed in the same tote drawer 19 until the order is filled.

There are a wide variety of other stations that could be added to the system as well. For example, once the orders have been consolidated, it may be necessary to pack and wrap the goods for shipping. In such a system, it would be desirable to include a pack/wrap work station 38. In other situations, the goods could be shipped directly in the tote drawers 19. FIGS. 12a and 12b show a floor plan incorporating a pack/wrap station.

In many warehousing applications, the consolidated drawers and/or the wrapped orders must be delivered outside the facility. Often delivery trucks would be used to deliver the orders. Normally it is desirable to load the truck in the reverse order of the delivery stops it will be making. Thus, a shipping station 39 could be provided to arrange the consolidated goods in an order suitable for loading onto particular trucks.

Issue Work Station

Each issue station includes a work area 13 having at least two work tables 14 adapted to receive the containers 25 and a temporary storage queue 15, that provides a place to temporarily store containers before they are moved to an appropriate work table 14. Additionally, several conveyor arrays are provided to transport containers between the various work station components. Specifically, a supply conveyor 50 carries containers from the conveyor network 24 to the temporary storage queue 15, a delivery system 51 transports containers between the temporary storage queue 15 and the work tables 14, and a takeaway system 53 (located below delivery system 51 in FIG. 5) returns the containers to the conveyor network 24 for transportation to another station.

Referring next to FIG. 5, the embodiment of the issue work station 22 chosen for the purpose of illustration will be described. The issue work stations 22 includes two work areas 13 that share a temporary storage queue 15 that takes the form of a vertical queue 16. Each work area 13 includes four work tables 14 which are preferably rotatable such that containers delivered to the work tables can be presented to the operator in any desired orientation. The vertical queue 16 forms a vertically oriented endless rotating carousel that allows containers to be randomly inserted and extracted therefrom. Thus, containers need not be supplied to the work tables 14 in the same order they are received by the work center. The actual construction of the vertical queue 16 may vary widely within the scope of the invention. A suitable structure is disclosed in co-pending application Ser. No. 815,800 filed Jan. 3, 1986.

By way of example, as shown in FIGS. 6 and 7, an alternative suitable vertical queue 16 comprises an endless progression of shelves 211 spaced along an endless chain (not shown) for travel around a frame 212. Each shelf 211 is attached to the chain by brackets 213. Suspension struts 214, 215 of appropriate length are secured via pivot points 217 to the corresponding brackets 213 so that the shelves are pivotably supported by the struts in a substantially horizontal orientation. The pivotal mounting causes the shelves 211 to always hang below the bracket and pivot point in a substantially horizontal orientation so that the containers may ride with the shelf as the shelf passes over from its up travel reach to its down travel reach. The chain may be driven by an electrically or hydraulically operated motor (not shown).

In the embodiment used for the purposes of illustration, movement onto and off of the shelves is gravity motivated. Thus, the shelves are constructed so that each has a permanent tilt. This may be seen in FIG. 6 with the right-hand sides being higher than the left-hand sides. Low friction rollers 218 on the shelves support the containers 25 in a potentially slidable condition. The rollers 218 are preferably free to rotate in only one direction. Power operated blockers 219 hold the containers on the shelves until they are ready to be released. With shelves arranged in this fashion, containers are received on one side of the vertical queue while they may be released on the opposite side. Preferably the motor is reversible so that the shelves may be rotated in either a clockwise or a counterclockwise direction. With such an arrangement, when a request is made for a particular container, the queue may be rotated in the shortest direction to the release point.

Referring specifically to FIGS. 5 and 7, a supply conveyor array section 50 may be provided with one or more transfer stops 225. In an embodiment of the transfer stops chosen for the purpose of illustration, each transfer stop has a plurality of transversely disposed traction rollers 221 mounted at longitudinally spaced locations along the conveyor sections 50 leaving spaces 222 between the rollers. Power driven endless belts 229 which are disposed within the spaces 222 may be selectively activated to divert the containers onto loading ramp 260. A power operated alignment stop 231 is provided at the end of each transfer stop to insure that containers to be diverted to the adjacent loading ramp 260 are properly positioned. Thus, when a container is delivered to a particular transfer stop 225, its associated alignment stop is raised and the container is carried by traction rollers 221 until it abuts against the alignment stop. A scanner 122 can be provided to detect the presence of a container within the transfer stop. After the scanner verifies that a container is properly positioned, the traction rollers may be turned off.

The loading ramp 260 may be tilted towards the vertical queue 16 and comprised of a plurality of transversely arranged low friction rollers 262. A power operated stopper 264 which may be pneumatically operated holds the containers until they are ready to be loaded onto the vertical queue 16. When a container 25 is to be loaded onto the vertical queue 16, the queue is rotated until an empty shelf is positioned adjacent the loading ramp 260 and momentarily stopped. The power operated stopper 264 is released and the container rolls freely over low friction rollers 262 and 218 onto the shelf until it abuts against power operated blocker 219.

It should be appreciated that the loading ramp 260 could incorporate power operated rollers or an actuator assembly capable of pushing containers onto the vertical queue to accomplish the same function.

When a container 25 is to be unloaded from the vertical queue, the queue is rotated until the appropriate shelf 211 is positioned adjacent the delivery system 51 and momentarily stopped. The appropriate power operated blocker 219 is released, thereby releasing the container which due to the tilt in the shelf 211 rolls freely across low friction rollers 218 onto the delivery system 51. It should be appreciated that the shelves could be substantially horizontal with traction rollers and accomplish the same function.

For higher capacity performance the vertical queue could have multiple loading ramps 260 and the delivery system 51 could be adapted to receive multiple discharges. In the embodiment shown in FIG. 5 and 7, the vertical queue is adapted to receive two side by side containers on each shelf. For still higher operation rates, multiple vertically aligned loading and discharge systems could also be provided for each.

The delivery system is essentially a conveyor network adapted to deliver the containers to an appropriate work table. The delivery system 51 may include a supply stop 120 for each work table. The supply stops 120 may be constructed similarly to the transfer stops 225 previously described with respect to the vertical queue. Each supply stops retains a particular container until the work table 14 with which it is associated (or an associated loading ramp) is ready to accept that container.

The work tables 14 are adapted to automatically receive and discharge containers and are positioned such that an operator can readily access the contents within a container 25 that is sitting thereon. The actual construction of the work tables 14 may be widely varied within the scope of the present invention.

Referring next to FIGS. 8 and 9, an embodiment of a work table chosen for the purpose of illustration will be described. The work table 14 includes a frame 303 having two front posts 304 and two rear posts 306. The posts are arranged in a rectangular fashion. A rotatable platform 309 is carried by a substantially rectangular base 310. A drive motor 312 which may be carried by base 310 rotates the platform 309 about a substantially vertical axis. The base 310 includes two pairs of parallel beams 311, 313, the beam pairs are substantially perpendicular to one another. Beams 311 extend along opposite sides of the frame 303 between one of the front posts and the corresponding rear post. The base 310 is connected to the respective posts by sleeves 315. Each sleeve 315 is slidably coupled to an associated post and attached to a drive chain (not shown) that may be selectively driven to raise or lower the sleeve with respect to its corresponding post. The movements of the front sleeves are mechanically coupled as are the movement of the rear sleeves. Thus, the platform 309 may be raised by moving all four of the sleeves simultaneously, or it may be tilted by moving only the front or rear sleeve pairs. A lever arm 317 pivotably connects the base to each rear sleeve to provide the necessary slack during raising and lowering. A first end of each lever arm is pivotably connected to the base, while the second end of the lever arm is pivotably connected to the associated rear sleeve. Thus, as will be appreciated by reference to FIG. 8, the front and rear ends of base 310 can be moved independently and lever arms 317 will provide or absorb the necessary slack.

The platform 309 carries a power operated gate 321, a plurality of rollers 323, side rails 325 and stopper 327. In the embodiment chosen for description, the delivery system 51 is disposed substantially above the takeaway system 53. Thus, when a container 25 is delivered to the rotating work table, the platform is raised to the height of the delivery system. The power operated gate 321 and a power operated stopper 264 on the adjacent loading ramp 260 are dropped and the container is guided by side rails 325 as it passes over rollers 323 until it is stopped by stopper 327. The power operated gate 321 is then raised to prevent the container from slipping off of the platform. To facilitate transferring a container from the loading ramp 260 to the platform 309, rollers 323 may be either power operated on low friction. Low friction rollers are appropriate if loading ramp 260 is slightly inclined to provide gravity motivation. With a gravity motivated system, the first roller 324 is preferably a breaking roller to slow down the container as it enters the work table platform. Platform 309 is rotatably mounted to beams 311, 313. An electric motor 312 rotates the platform as necessary.

Once a container is in place on the work table, the height of the platform may be adjusted to suit a particular operator and tilted to provide better access. Tilting is accomplished by raising the rear sleeves relative to the front sleeves. To insure operator comfort, it is generally desirable to adjust the platform to approximately waist height and tilt the table in the approximate range of 15 to 30 degrees towards the operator.

After the operator is done with the container, the platform is lowered to the level of the takeaway system 53, the power operated gate 321 is dropped, and the container is released. Again the container transfer may be accomplished either through the use of power operated rollers or by slightly inclining the platform.

Consolidation Queue

The consolidation queue 18 is positioned adjacent the work tables 14 such that an operator may conveniently work between the two. Structurally, the consolidation queue may take a form very similar to the vertical queue 16. Referring next to FIG. 10, the embodiment of the consolidation queue chosen for the purposes of this description comprises an endless progression of horizontally oriented shelves 415 spaced along an endless chain (not shown) for travel around a frame 417. Each shelf is attached to the chain by brackets 419. Suspension struts 421 of appropriate length are secured via pivot point 423 to the corresponding brackets 419 so that the shelves 415 are pivotably supported by the struts in a substantially horizontal orientation. The pivotal mounting causes the shelves 415 to always hang below the bracket and pivot point in a substantially horizontal orientation so that the totes 19 may ride with the shelf as the shelf passes over from its up travel reach to its down travel reach. The chain may be driven by an electrically or hydraulically operated reversible motor (not shown). Thus the consolidation queue may be rotated in either direction. It will be appreciated that two or more shelves could be suspended from each bracket/suspension strut arrangement to accomplish the same effect.

The shelves 415 are sized and arranged such that a plurality of totes 19 may be placed side by side on each shelf. Preferably, each shelf has a plurality of tote pads (not shown) each of which receives a single tote drawer 19. By way of example, in a large scale consumer products warehousing application as previously described, a suitably sized consolidation queue 18 would have approximately 60 shelves with each shelf holding about 10 tote drawers. Alternatively, the consolidation queue could be configured to carry a plurality of containers 25 on each shelf. Such an arrangement is desirable particularly in warehousing systems wherein consolidated or kited goods are to be returned to a storage carousel for storage rather then delivered for immediate shipping or production use.

A fixed loading shelf 430 is disposed on the front side of the consolidation queue at about waist level. A plurality of pneumatic rams (not shown) are disposed within the opening in the center of the endless chain opposite the fixed loading shelf 430. The actual number of pneumatic rams will correspond to the number of tote pads carried by each shelf 415, with each ram being associated with a particular one of the tote pads. The pneumatic rams are positioned such that when one of the shelves 415 is positioned adjacent the fixed loading shelf 430, and a particular ram is actuated, it will push its associated tote drawer onto the fixed loading shelf 430. By way of example, suitable pneumatic rams are produced by Bimba Manufacturing.

A panel 433 covers a portion of the front of the consolidation queue above the fixed loading shelf 430. A track 437 on the front surface of panel 433 is adapted to carry a printer 435 back and forth along the front of the consolidation queue such that it may be positioned over any open tote drawer. The printer is adapted to print invoices stating the goods actually placed in each tote drawer 19.

To fill a particular tote drawer 19, the shelf on which the tote drawer is located is rotated until it is positioned adjacent the fixed loading shelf 430. The pneumatic ram disposed adjacent the chosen tote is then actuated, thereby pushing the tote onto fixed loading shelf 430. A video monitor 455 positioned adjacent the consolidation queue instructs the operator as to the identity and quantity of goods to be placed in the open drawer. Printer 435 is automatically positioned above the open drawer end prints a shipping invoice voucher. After the operator places the desired goods into the open drawer, the invoice is placed into the drawer which is then either manually or mechanically closed.

Depending upon the particular application of the system for delivery, the totes may be delivered to a pack/wrap work station 38, a shipping station 39, a production work station 37 or other suitable stations. A carriage (not shown) is provided for shuttling the totes between the consolidation queue and either a shipping queue (as shown in FIG. 1) or a tote delivery conveyor array 29. Tote drawers are loaded onto and unloaded from the consolidation shelves 415 along the back side of the consolidation queue 18 by the carriage. A plurality of pneumatic extract rams (not shown) are disposed within an opening in the center of the consolidation queue (i.e. in between the shelves on an up travel reach and those on a down travel reach). The extract rams are positioned opposite the fixed loading shelf 430. The actual number of extract rams will correspond to the number of tote pads carried by each shelf 415, with each ram being associated with a particular one of the tote pads. The extract rams are positioned such that when one of the shelves 415 is positioned adjacent the carriage, and a particular one of the rams is actuated, it will push its associated tote drawer onto the carriage. The carriage is preferably positioned at a different level than the fixed loading shelf 430 so that the pneumatic rams and the extract rams don't get in the way of each other.

In the preferred embodiment, the carriage works only on a single level, although for higher volume operations multiple carriage structures could be provided in vertically spaced alignment along the back side of the consolidation queue. The carriage may take any form that is suitable for loading totes into the consolidation queue and receiving totes for transportation to the tote delivery conveyor array.

Receiving Work Station

To effectively service the system, there may be one or more receiving work stations that are dedicated to entering goods into the system as shown in FIGS. 1 and 11. To simplify the system it is preferable that the various stations use a minimum number of different types of components. Thus, a suitable receiving work station could include one or more temporary storage queues 15, a receiving transport conveyor 505, two or more work tables 14, a cubing table (not shown), a delivery system 51 for transporting containers between the temporary storage queue and the work tables, and a takeaway system 53 for returning containers to the conveyor network 24 for transportation to another station.

Additionally, it may be desirable to provide the receiving transport conveyor 505 with a temporary storage queue for holding received packages until an operator is ready to work with them. The receiving transport conveyor 505 is adapted to carry a typical assortment of packages of material of the sort to be stored in the containers 25. Of course, the actual shape and sizes of the received packages can take virtually any shape. Thus, the temporary storage queue must be designed to accommodate packages of widely varying sizes. The random vertical queue 16 described above works quite well for this purpose. It will be appreciated that it is possible that some, or even all of the received goods could be prepackaged in containers suitable for direct entry into the warehousing system.

In a fully automated system many, if not most, of the goods stored in inventory would have appropriate bar coded labels that could be read by a bar code reading identification scanner 126. Thus, when an operator receives a package, a handheld bar code scanner 126 could be used to automatically identify the goods. The operator would then only need to verify that the scanner recorded both the proper identity and quantity of the received goods. The receiving station would be provided with a terminal having a monitor 455 which displays the information read. The terminal may take the form of a personal computer or any other suitable computer terminal. Thus, if the scanner is unable to identify the received goods, or the goods were damaged or otherwise nonconforming with what was expected, then the operator could manually input the correct information.

As described above, it is contemplated that many of the containers will have multiple compartments and that any particular container having multiple compartments would have a variety of different goods stored within its various compartments. To optimize space utilization within the warehousing system, it is desirable to have each of the containers as full as possible. Thus, contrary to what might be the intuitive approach, it is desirable to refill a container well before it is completely emptied. Therefore, containers are generally brought to the receiving station partially full, with some of their compartments empty. Thus, the controller must coordinate the volume of a received package with a container having a compartment large enough to receive those goods. This is why it is desirable to have a temporary storage queue associated with the receiving work station. The integration between the random vertical queue 16 and the work tables 14 may be accomplished just like the integration described with respect to the issue stations.

The cubing table is provided to calculate the size and weight of goods inputted into the system and the compartment size that will be required to receive those goods. Once the size and weight of a particular item have been determined, the system controller can remember the measured physical characteristics of the item. Therefore, any time similar goods are received in the future, the controller can automatically calculate the compartment size that will be required for any given volume received. A container 25 having an empty compartment of suitable size can then be delivered to the work table 14 to received the inputted goods.

It will be appreciated that in high volume operations, it may be desirable to provide temporary storage for received goods so that the receiving function and the container loading functions can be separated to maximize efficiency. To accommodate this, a consolidation queue as previously described, could be provided. For most continuously operating high volume systems, four work tables is an appropriate number for each operator.

Conveyor Network

Transportation of containers 25 between the storage carousels 10, and the various work stations is accommodated by conveyor network 24. The conveyor network is preferably arranged in a continuous loop, with means for selectively diverting containers from the continuous loop to a particular work station or storage carousel disposed throughout the system at appropriate points. A wide variety of appropriate conveyor and diverter structures are well known. A conveyor controller 74 (FIG. 15) directs the transportation of containers about the conveyor network. A plurality of identification scanners 126 are disposed throughout the network to inform the conveyor controller of the identity of passing containers.

Shipping Station

In many warehousing applications, the totes and/or wrapped packages must be delivered outside the facility. When delivery trucks are to be used to deliver the orders, it is desirable to load the truck in the reverse order of the delivery stops it will be making. In high volume operations, there may be a need to provide a separate shipping station which automatically arranges the totes and/or wrapped packages into an order suitable for loading the trucks.

Of course, the actual construction of the shipping station may be widely varied. However, in an embodiment of the invention chosen for the purpose of illustration, a shipping queue is provided having a construction substantially identical to the consolidation queue 18 previously described, except that there is no need for the fixed loading shelf 430 or printer 435. Filled totes are delivered to the shipping queue either directly from the consolidation queue 18 through the carriage assembly or via tote conveyor array 29. The shipping queue is loaded and unloaded using a carriage arrangement as described with reference to the consolidation queue. The identity of the totes is read by an identification scanner 126 prior to insertion onto the shipping queue and the shipping station controller can readily integrate the removal of totes from the shipping queue in the desired order. It should be appreciated that in lower volume operations, the required ordering could be accomplished by the consolidation queue itself.

Operation of the System

In operation, when material goods are received by the warehousing system they are placed An containers 25 unless their packaging is suitable for storing on the storage structure 10. The goods may be introduced into the system in a dedicated receiving station. Alternatively, one of the issue stations could be used during the receiving operation. An inventory record is kept which records the identity and quantity of the received goods placed in each container along with an indication of the particular container compartment into which the goods are placed. Thus, when an item is received for inventory, an operator records the identity and quantity of the received goods. Therefore, as will be described below, the system controller knows the identity of the containers on each of the work tables and the location of empty compartments within the container. After the operator has indicated the identity and quantity of the received goods, the controller calculates the space that will be required by the goods and directs the operator to place the goods in a particular container compartment.

In order to minimize the total space required by the warehousing system it is desirable to minimize the empty shelf space on the storage carousel. Thus, the containers should be as full as possible. Therefore, any time a compartment within a container is filled, any other empty compartment within that container should be filled as well if at all possible.

In the preferred system, no attempt is made to restock partially empty containers with the same goods. Therefore, at any given time in most large warehousing system, many of the products will be available in two or more containers. The inventoried goods are generally distributed on a first in first out basis or in accordance with other standard practices. To insure efficient space utilization, if more than one containers carry the same item, the containers should be emptied serially. That is, the goods within a particular container should be completely distributed before starting to empty a second.

Filled containers are carried by the conveyor network 24 to the storage carousel 10 wherein they are randomly inserted onto an open rack. The position at which each container is stored on the storage carousel is recorded by the control system so the container may be readily retrieved.

When an order is received, it is entered into a computer which searches the inventory record to determine whether the ordered goods are in inventory. Using the consumer products and pharmaceutical warehousing system discussed above as an example, in any given day several hundred customers may place orders calling for 50,000 or more individual stock units, with the actual number of units requested for each stock unit varying widely. Therefore, in large scale operations, a master computer would be used to organize the orders into related batches, with each batch corresponding to a family of related goods. By way of example, related families might include: hair care products; first aid products; RX; sporting goods, etc. The orders can be filled in batches to optimize efficiency. If more than one issue station is provided, then the batches of orders could be distributed to the operating work centers as necessary to keep each station busy.

The issue station 22 is arranged for efficiently consolidating orders. When an operator is ready to begin filling orders, one of the containers that carries ordered items is delivered to a work station. Each tote drawers 19 on consolidation queue 18 is adapted to receive a specific order. By way of example, a specific container #1234 that carries aspirin, Valium, and several other drugs may be delivered to the work table, with aspirin being the first product to be distributed. At that point, one of the tote drawers associated with an order that requires aspirin will be opened. An instructional video terminal 55 is positioned adjacent the work tables in full view of the operator. The video terminal instructs the operator which items are to be distributed next and the quantity of units to be distributed in a given step. In the example given, aspirin is the first displayed item and the video terminal would inform the operator as to how many units of aspirin will be distributed. The operator may then pick the desired number of units and step over to the consolidation queue. An instructional video monitor 455, mounted adjacent the consolidation queue within the operators view is caused to display the number of boxes of aspirin that are to be deposited into the open tote drawer 19. After depositing the appropriate amount of aspirin in the first drawer, the operator shuts the first drawer and another automatically opens with the video monitor displaying the number of units to be placed in the next drawer. This cycle may be continued until either all of the aspirin within the container has been distributed or all of the pending orders for the aspirin have been filled. Once the aspirin has been distributed the Valium would be distributed in the same manner. After all of the ordered items within the container #1234 have been distributed, it would be returned to the storage structure or other appropriate station.

While the contents of the first container are being distributed, a second container is delivered to a second work table adjacent the first. The contents of the second container are then distributed in the same manner. It will be appreciated that with such a system a very large number of orders can be filled with a minimum number of operator man-hours.

It has been determined that for most high volume operations, approximately four work tables are desirable to insure that the operator will virtually always have something to distribute. It will be appreciated that the actual number of orders that request a particular stock unit will vary greatly. To insure smooth operation, it is desirable to regulate the delivery of containers to the work tables to provide balance. Thus, rather than filling all of the work tables with containers carrying stock units that are only requested in one or two orders each, the control system is preferably designed to deliver some containers that have a relatively large number of orders to fill simultaneously with those having only a few to reduce the likelihood that the operator will fill the orders faster than the system can provide new containers.

It should also be appreciated that the actual sequence in which the various products are distributed may be widely varied within the scope of the present invention. The actual distribution sequence will most likely be the product of an optimization routine tailored to a specific application. Thus, in our example, suppose that one of the orders calls for a toothbrush. When the shelf carrying the tote associated with the order for a toothbrush is positioned adjacent the fixed loading shelf 430, it may be desirable to distribute the toothbrush at that time, rather than waiting for all of the aspirin orders to be filled and having to rotate the consolidation queue back to the proper shelf. The video terminal 55 and video monitor 455 would display appropriate instructions to the operator. It should be apparent that the instructions of video terminal 55 and monitor 455 could be presented in a wide variety of ways and that they could easily be integrated into a single display unit.

The temporary storage queue 15 (preferably in the form of vertical queue 16) is provided to insure that working containers will always be available to the work tables. Thus, the system is able to request containers from the storage carousel well in advance of the time they are actually required to eliminate delays while the containers are being retrieved from storage. Similarly, the supply stops 120 in delivery system 51 disposed between the vertical queue 16 and the work tables 14 right before the work tables, reduce the downtime between discharging a spent container from the work table until delivery of a new one.

The aforementioned process is repeated until all of the orders in the batch are filled. After a batch of orders have been filled, shipping/invoice tickets are printed for the various orders and placed into the totes. A suitable printer may be disposed adjacent the work area. The consolidated orders disposed in tote drawers 19 are then ready for delivery to the customers. The tote drawers may be readily removed from the consolidation queue for delivery to the final destination. If the customer is an internal production facility, the totes are delivered to the production work stations. If the orders are to be delivered by mail or parcel poet, the totes would be delivered to a wrap/pack station for wrapping or packing. If the goods are to be delivered to the customers by truck in the totes, the totes are arranged in reverse delivery order to facilitate loading onto a delivery truck. Although the totes could be readily arranged by selecting the order of their removal from the consolidation queue, in high volume operations, such a procedure would take to much time and therefor a separate shipping station could be provided to coordinate the outgoing freight shipments.

Alternative Warehousing System

Referring next to FIGS. 12A and 12B, a larger scale integrated embodiment of the invention chosen for the purpose of illustration will be described. As seen therein, the warehousing system includes a plurality of storage carousels 10, a receiving work station 20, a plurality of issue work stations 22, a plurality of pack/wrap stations 38 and a disposal station 36. The various stations are interconnected by a conveyor network 24.

This embodiment of the warehousing system is specifically adapted for a system where many of the consolidated orders need to be packed, wrapped, assembled, or otherwise worked by an operator. When possible, the individual components may be similar to those described with respect to the previous embodiment. When inventoried items are received by the warehousing system they are received through receiving workstation 20 and placed into containers suitable for storage on the storage carousels 10. The loaded containers are then carried by conveyor network 24 to one of the storage carousels where they are inserted onto a rack. In the embodiment shown in FIG. 12, insertion occurs at one end of the carousel while extraction occurs at the opposite ends. It will be appreciated that for higher volumes insertion and extraction could occur on both ends or alternatively the system could be arranged so that insertion and extraction occurred only at one end. When orders are received they may be consolidated at issue stations 22 as previously described. In this embodiment, however, consolidation queue 18 is adapted to receive containers 25 as opposed to totes 19. Thus, the consolidated orders may be returned and saved on the storage carousels 10. Conveyor network 24 is adapted to carry containers 25 between the consolidation queue 18 and storage carousels 10. The pack/wrap station 38 is designed to work substantially independently of the issue station. Thus, after an order has been consolidated, if no operators are available to pack, wrap or otherwise work the consolidated goods, the container may be returned to storage carousel 10. Then when an operator is ready to begin the packing and/wrapping operations, containers holding goods to be packed or wrapped are called by the pack/wrap station and the appropriate packing begins. Suitable structures for the pack wrap station and the disposal station are described below.

Typically, it will be desirable to provide the consolidation queue with empty containers prior to receiving the consolidated orders. The containers may be delivered directly from one of the storage carousels. Since the master controller maintains an inventory record that tracks the goods in each container, it knows which containers are empty and thus suitable for delivery to the consolidation queue to receive consolidated orders.

Pack/Wrap Work Station

In some systems, either a tote 19 or a container 25 will be supplied with a completed order that must be packed, wrapped or both packed and wrapped. To facilitate packing and wrapping, a pack/wrap work station may be provided. By way of example, a pack/wrap station will be described with reference to FIG. 12 wherein the consolidated orders are placed into containers 25. It should be appreciated, however, that a pack/wrap station could be provided for goods stored within totes 19 just as well.

Referring now to FIG. 13, a container 25 having goods to be packaged is diverted to the pack/wrap station at the switch location 554. The diverted container travels along the stub conveyor 555 to a vertical queue 516 of the type previously described. The containers are loaded progressively onto the vertical queue 516 to be called for when an operator is available. It should be appreciated that the vertical queue construction described works suitably for totes as well as containers. However, when totes are used, it may be desirable to downsize vertical queues adapted to handle totes to minimize space.

In coming off the appropriate vertical queue 516, the container is deposited upon a receiving end 560 of a conveyor stub 561 which serves the pack/wrap work station 38. Conveyor stub 561 delivers the containers to the appropriate work tables 565. The work tables 565 may take the form of the rotatable work tables previously described or simple tilt table as shown in FIG. 13 as many of which will be provided as are needed to perform the packing and wrapping operations at sufficient speed. Scales 563 may also be provided to weigh the packaged goods. The scales are particularly important for mail order warehousing operations. Open bench type work tables 514 are provided to give the operators room to go about their task. It will be appreciated that the work station can be configured so that the supplies that the operator will need can be disposed adjacent the work area. Further the packing supplies may be stored on the storage carousel, and when the operator needs additional supplies, they may be ordered merely by requesting the particular goods which can then be delivered in the same manner as the other containers arrive. After the pack/wrap operation has been completed, the containers are reloaded onto conveyor stub 561 which connects with the conveyor network 24 for delivery to the disposal or other appropriate work station or back to the storage carousels.

The disposal work station functions simply as a shipping dock and containers may be delivered thereto by conveyor network 24. A wide variety of conventional shipping terminals would be appropriate for the disposal work station.

It should be appreciated that the pack/wrap station could readily be replaced by a production assembly station or any other station that may be necessary in a particular application. Further, if the consolidated goods were carried by totes which were to be to be shipped outside the warehousing system, the totes could be delivered directly to a shipping or disposal station after leaving the pack/wrap station.

Production Warehousing System

Referring next to FIG. 14, yet another embodiment of the invention will be described. This embodiment is configured specifically for a production environment. Recent studies investigating productivity and quality control have led a gradual shift away from production lines wherein each employee adds only one or two small parts to a larger system. Rather, the trend is to allow individual workers to individually assemble larger components or whole products in an attempt to raise job satisfaction and increase productivity. A drawback of such a system is that in order to effectively allow a single assembler to put together a product having a large number of parts, is important to "kit" the parts. That is, they should be arranged in readily accessible groups in reverse order of construction. In many production lines, the kiting stage proves to be the slowest link. As will be described with reference to FIG. 14, the warehousing system of the present invention lends itself very well to integration of a production assembly plant. The system shown in FIG. 14 has a storage carousel 10, a receiving work station 20, issue work stations 22 (which function to "kit" parts for assembly), a plurality of production stations 37 and an inspection station 138.

Two separate conveyor networks 24 are provided. The first connects the first end of the carousel to the receiving and issue stations. The receiving station has the same function as those previously described while the issue stations are adapted to "kit" items for production. The kited items are placed in containers 25 on consolidation queue 18 as in the embodiment described above. Containers holding both bulk goods and the kited goods are returned to the consolidation queue for storage until they are needed. The second conveyor network is coupled to end of the storage carousel opposite from the first conveyor network. Thus, both conveyor networks have independent lifts 40, inserter assemblies 42 and extractor assemblies 44. It will be appreciated that all items that may be necessary for the production work station can be stored on the carousel, so long as the parts are of a size suitable to fit within containers 25. Therefore, when an assembler arrives, a plurality of kits can be delivered to the appropriate production work station 37. Additionally, if any other parts are required by the work station, the assembler may request the specific parts needed.

It will be appreciated that the potential throughput of the system is effectively doubled by utilizing extractor and inserter assemblies on both ends of the carousel. This is particularly beneficial in high volume operations. Still further additional supply and takeaway conveyors could be coupled to the lift to provide even higher throughputs.

The production work stations may be configured in any suitable form. Typically, a vertical queue 16 would be provided to store kited parts for assembly. When an assembler is ready for work, a container holding kited parts would be delivered to his work area. It will be appreciated that multiple containers could be provided which carry parts for assembly. The worker would then proceed to assemble the desired device in accordance with standard practices. After assembly, the finished device could be alternatively delivered to an inspection station or a storage carousel 10.

It will be appreciated that with the system described, there is no need to take the assembled part direct to inspection. Rather, an assembled product could be returned to the storage queue for storage until an inspector was ready to test the assembled goods. Thus, the inspector would be able to work independently of the assemblers. Therefore, the assemblers and the inspectors are free to work at their own paces. When an inspector is ready to begin operation, they would request delivery of containers holding assembled products to the inspection station. It should be appreciated that a vertical queue could be provided to temporarily hold assembled products so that the inspectors continually have products to work on. The actual construction of the inspection station may take any desirable form. By way of example, a layout similar to the pack/wrap station previously described could be used. However, it should be appreciated that appropriate equipment for testing the devices may be provided. After testing, the goods could be either directed towards a shipping station or returned to the storage carousel 10. It should be appreciated that completed items may be delivered to the shipping station at any desired time.

Controller System

It will be appreciated that a wide variety of automated controllers could be developed to drive the warehousing systems heretofore described. A good control system must lend itself to a modular construction so that if and when the needs of the warehousing system change (the desired volume often tends to rise), additional storage carousels and/or work centers can be readily added to the system with little or no change in the system software. To maximize efficiency, the system controller should be arranged to insure that an operator working at one of the work centers will always have work on hand as opposed to having to wait for a working container to arrive. Efficient integration of the system requires a tremendous amount of computing power.

A representative control architecture for integrating the various components of the warehousing system shown in FIG. 1 will be described with reference to FIG. 15. In essence, the master controller 26 orchestrate the system through a plurality of pyramided local area networks (LAN's). The master controller 26 is connected through a local area network to a storage facility controller 70, and one or more work center controllers 72. The storage facility controller 70 is responsible for all of the storage carousels and their associated inserters, extractors and lifts, as well as the conveyor network 24. A work center controller 72 is provided for each issue, receiving, wrap/pack and/or shipping station.

There are a wide variety of work flow algorithms that can be used to integrate and control the various stations. Conceptually, when a customer (incoming) order is received, the incoming order is entered into the master controller and checked against an inventory file to determine whether the desired goods are in inventory. On any given day, numerous incoming orders will be received, with the number of orders received being entirely dependant upon the nature of the warehousing system. Thus, by way of example, in the consumer products warehousing application described in the background section, several tens of thousands of individual product orders may be received on any particular day.

All of the incoming orders are entered into the system, and by way of example, 50 of the orders may call for at least one unit of a particular brand of aspirin, while 40 call for a particular brand of soap and 15 request a particular toothbrush etc. The master controller 26 maintains an inventory record that remembers which products are in inventory, their respective quantities, and the containers in which they are carried. Thus, the master controller 26 would remember that, by way of example, container #1234 has 16 boxes of the desired aspirin remaining, while containers #1235 and #1236 each have 200 boxes of that aspirin. If the containers are divided into compartments as described above, the actual compartment location of the goods would be remembered as well.

In addition to remembering the contents within each container 25, the master controller remembers the general location of each container within the system. That is, whether it is located in the storage carousel, the receiving station, the issue work station, the conveyor system etc. It should be appreciated that identification scanners 126 capable of reading the identifying indicia 36 carried by each container 25 are disposed throughout the warehousing system. Thus, any time a container 25 passes from one station to another, the identifying scanner 126 will inform the appropriate station controller of its arrival, which in turn informs the master controller that it now has the received container.

In the preferred embodiment, each controller on the primary LAN (i.e., master controller 26, work center controllers 72 and storage facility controllers 70) will each include a computer terminal which allows an operator to interface directly with the specific controller.

Storage Facility Controller

The storage facility controller 70 is responsible for maintaining a storage record which remembers which containers are within its possession, the storage carousel upon which each of the containers 25 are hung and the actual position (by tier and rack number) at which the container is stored. Additionally, the storage facility controller is responsible for coordinating communications with the master controller 26 and the various work centers as well as overseeing the insertion and extraction of containers from the various carousels. Further, the storage facility controller orchestrates activities of the conveyor network 24.

A representative embodiment of the storage carousel control system is shown in FIG. 16. As seen therein, the storage facility controller manages a plurality of carousel controllers 80, 81 each of which is associated with a particular storage carousel 10 etc. The storage facility controller 70 receives requests from either master controller 26 or a work center controller 72 requesting one or more containers 25.

As will be appreciated from the discussion below, one of the prime benefits of the control architecture described herein is that it facilitates intelligent decisions as to which container should be provided to ensure efficient operation of the warehousing system. Specifically, when a work center 12 has room for another container 25, rather than requesting a specific container which may be located elsewhere in the system or on a rack which will not come around to the extractor assembly 44 for several minutes, the work center controller provides a list of several containers (which may vary between 1 or 2 and 50 or more), which would be acceptable. The work center controller also indicates how many containers it has room for. Thus, the storage facility controller 70 is provided with a list of acceptable containers that it may provide and the actual number of containers it should provide. The storage facility controller then surveys its own memory to determine which of the requested containers are presently under its control and where those containers are positioned within the various storage carousels 10. Then knowing the positions of the requested containers, the pending extraction requirements and the openings on the lift 40, the storage facility controller decides which of the listed containers is easiest to access and thus should be provided. The storage facility controller sends an extraction command to the carousel controller associated with the storage carousel 10 that holds the desired container. The message indicates to the carousel controller only that the container in a particular storage rack position should be removed. The carousel controller 80 issues the appropriate signals to cause an extraction of the desired container. It then reports to the storage facility controller 70 whether or not the extraction was successful.

To ensure that the storage facility controller 70 has the latest information about the contents of the storage carousel 10, an identification scanner 126 is provided on each tier of storage carousels 10 and positioned to read the identifying indicia 36 attached to the containers 25. The identification scanners are preferably disposed just before the extractor assembly, to increase the probability that the desired container can be removed even in the event of a system failure. Each time an array of containers 25 passes by the identification scanners 126, the identity of the containers is reported to the carousel controller 80 which in turn reports both the container numbers and the rack storage positions to the storage facility controller 70. Thus, the storage facility controller is continually updating its storage records of the rack positions each container is stored on. The carousel controllers 80, 81 each control the detailed operation of their associated storage carousel 10 along with its inserter assembly 42, extractor assembly 44 and lift 40.

Work Center Controllers

Referring next to FIG. 17, the operation of a work center controller 72 that controls an issue station will be described. Each work center controller 72 is responsible for coordinating the activities of the components within the work center and communicating with the master controller 26 and the storage facility controller 70 to keep the work station operators busy. At the beginning of the day or other suitable time interval, master controller 26 transmits a batch of orders to the work center controller 72 thereby informing it of its responsibilities for the day or time interval. Thus, the work center controller 72 knows what orders the issue station it controls will need to fill, how those orders should be packaged and what containers 25 hold the goods needed to fill its orders. The work center controller 72 then operates substantially independently to process its orders. Initially, the work center controller sends a request to the storage facility controller asking for as many containers 25 as the work center can presently accommodate. As noted, the request will be in the form of an extended list of acceptable containers from which the storage facility controller may select any subset thereof to satisfy the request. The storage facility controller 70 then informs the work center controller which of the requested containers it will be forwarding.

In the embodiment chosen for the purpose of illustration, the work center controller manages the activities of an issue station that includes one vertical queue 16, two work areas and the conveyor components necessary to connect the components as previously described. Each work area includes four rotatable work tables 14 and a consolidation queue 18.

The work center controller 72 coordinates activities between a queue controller 83, a pair of consolidation controllers 85 and a local conveyor controller 87. The queue controller 83 manages vertical queue 16 and the work tables 14. The local conveyor controller 87 manages the activities of supply conveyor 50, delivery system 51 and takeaway system 53. The consolidation controller 85 manages the consolidation queue 18 and its respective tote drawers 19. The controlled consolidation activities include rotation of the consolidation queue 18, the insertion and removal of tote drawers 19 from the consolidation queue, and the opening of tote drawers 19 onto the fixed loading shelf 430. The consolidation controller also communicates with a plurality of sensors (not shown) that are adapted to detect the closing of a particular drawer.

When a container is diverted from the conveyor network 24 onto the supply conveyor array 50. An identification scanner 126 acknowledges the reception of the particular container and informs the conveyor controller 87 of its arrival. The conveyor controller informs the queue controller 83 and the work center controller 72 of the arrival of the container. The queue controller responds by instructing the conveyor controller to deliver the container to a particular loading ramp 260. The conveyor controller then delivers the container through the appropriate transfer stop 225 to the selected loading ramp. The queue controller 83 is then informed of the arrival of a container. The vertical queue is rotated until an empty shelf is disposed adjacent the loading ramp 260. Queue controller then orchestrate inserting the container onto the vertical queue 16 and remembers its storage position. In the gravity motivated loading ramp previously described, this is accomplished by releasing power operated stopper 264.

When an operator is ready to begin filling the aspirin orders, the work center controller 72 provides the queue controller 83 with a list of desired containers known to be in the vertical queue. The queue controller then chooses the listed container that is easiest to provide (typically the container closest to the delivery system 51) and causes the vertical queue to rotate until the selected container is adjacent the delivery system, wherein the queue is momentarily stopped and the appropriate power operated blocker 219 is released allowing the selected container to roll onto the delivery system 51. Once the queue controller chooses the container(s) to be delivered, it informs the work center controller 72 of its choice. The work center controller then instructs the local conveyor controller 87 to deliver the container to a particular work table 14. The local conveyor controller then manages delivery of the container to the loading ramp 260 associated with the chosen work table. The queue controller is informed when the container is actually delivered to the work table loading ramp. When the work table itself is emptied and positioned to receive the next container, the queue controller informs the local conveyor controller of the opening. The local conveyor controller then causes the container to be transferred to the rotating work table. The queue controller acknowledges receipt of the container and informs the work center controller 72 of its arrival on the work table. If by way of example, the selected container is #1234 (which in our example carries 16 boxes of aspirin) the work center controller 72 is so informed.

After a container is received by the work table the platform is positioned at the proper height for the particular operator and tilted towards the operator. If the work tables are rotatable so that the containers may be presented to the operator in any orientation, the work center controller would inform the queue controller of the desired orientation as well. The queue controller would be responsible for rotating platform 309 to present the container at the proper orientation. An identification scanner may be provided adjacent the delivery system 51 to determine the container orientation before it enters the work table.

Once the container is disposed on the work table, the work center controller decides how the goods contained therein will be distributed. Using the aspirin example, the work center controller informs the consolidation controller 85 of specific shelves and tote drawers to be opened and the sequence in which they should be opened. Simultaneously, instructions telling the operator the identity and quantity of the next items to be picked are displayed on video terminal 55 and video monitor 455. By way of example, the video terminal may indicate the identity of the next few stock items to be distributed, the table on which the container holding the goods is located, the compartment within the container holding the goods and the total number of stock units to be distributed. The video monitor 455, which is disposed adjacent the consolidation queue may display the number of stock units to be placed in each tote drawer together with a short description of the stock unit (i.e., Bayer aspirin).

The consolidation controller 85 causes the consolidation queue to rotate until the desired shelf is adjacent the fixed loading shelf 430. Once the proper shelf is in position, the consolidation controller actuates the appropriate ram thereby causing the first selected tote drawer to open and the operator places the required number of units therein (as displayed on video monitor 455). When finished, the operator manually closes the tote drawer. The closing event is detected by a sensor (not shown) which informs the consolidation controller 85. The consolidation controller then directs the next drawer to open and informs the work center controller of the closing event. The work center controller updates the video terminal and monitor to eliminate the finished order. Preferably, the video monitor would always display the next several picks so that during a single trip to the work table, the operator can grab enough stock units to fill several orders when appropriate.

It will be appreciated that the work center controller 72 need only inform the consolidation controller of the identity and sequence of the drawers to be opened. Preferably only the next few drawers to be opened would be disclosed at any one time, with the list being periodically updated.

It should also be appreciated that the work center controller 72 knows how many more drawers are to be filled with aspirin, as well as how many units of aspirin are expected to be in the active container. Thus, if all of the active aspirin orders have been filled, or if the entire supply of aspirin is depleted, the work center controller would determine whether there are any other products to be distributed from the active container. If so, those products would be distributed in the described manner. If not, the queue controller 83 would be directed to discharge the aspirin container #1234 to the takeaway system 53 which returns the container to the conveyor network 24.

The described cycle is repeated until all of the orders have been filled. It should be appreciated, that in some cases it may be desirable to have the operator interrupt distributing goods disposed in a container located on one work table to distribute goods from another container. This is particularly true if the second container has only a few goods to be distributed. Since several totes are arranged in parallel on a single shelf, when the consolidation queue is rotated such that the tote designated to receive items from a second or third container are positioned adjacent the fixed loading shelf 430, then the work center controller could direct the consolidation controller to open the tote drawer associated with goods from the second container. The operator would be informed of the switch by video monitor 55. Since the consolidation controller is only instructed to open particular totes drawers, it does not need to be specifically informed of the switch.

It should be appreciated that if the work tables are rotatable to present the operator with a particular side of the container, the work center controller also must provide the queue controller with information concerning the desired orientation of the container. A scanner disposed adjacent the delivery system 51 interrogates the container to determine its orientation prior to delivery to the rotating work table 14. The queue controller then directs the rotating work table to align itself in the desired orientation. If the container holds two material items that are to be simultaneously distributed, it may be necessary to rotate the container after the first item has been picked. This is accomplished simply by having the work center controller direct the queue controller to rotate the container the desired amount.

The general control architecture for a receiving work station similar to the one described above will be very similar to the controller described for the issue work station. The receiving station includes a vertical queue 16, a plurality of work tables 14 and various conveyor arrays (i.e. receiving transport conveyor 505, delivery system 51 and takeaway system 53) for transferring containers between such components and the conveyor network 24. Thus, the receiving work station would have a work center controller 72 which directs a queue controller 83 and a local conveyor controller 87 as discussed in relation to the issue station controller described above. A receiving controller 89 would orchestrate the reception of goods into the system through whatever conveyor and temporary storage facilities may be provided.

The receiving work center controller also monitors bar code scanner 126 which is used to identify received goods. If the received goods have appropriate bar code label indicating both the identity and quantity of the goods, then upon learning the nature of the received goods, the receiving work center controller 72 calculates the container size necessary to hold the received goods and directs the queue controller to deliver an appropriate container to a work table. The operator then places the received goods into the container and indicates that the container has been filled. If all of the compartments within the container are occupied, then the container is returned to the storage carousel. If not, then the container may be held to receive additional items.

The receiving work center controller maintains an inventory dimensions file which remembers the size and weight of all each of the inventoried goods. Thus, when a new shipment of aspirin is received, the work center can automatically calculate the appropriate container size necessary to hold the received aspirin. If such information is not available, the operator places a representative box of aspirin on the cubing table. The box is then weighed and its dimensions are measured. Such information is inputted into the work center controller which can then calculate the weight and volume occupied by the entire amount of aspirin received. An appropriate fudge factor is incorporated as a part of the calculations to insure that there is plenty of room within the container compartment chosen to carry the goods. The work center controller would then add the measured dimensions of the product to the inventory dimension file.

It should further be appreciated that in order to further speed the rate at which goods can be received, the receiving station 20 could further include a consolidation structure into which the received goods could be temporarily placed when containers having open compartments sized appropriately to hold the received goods are not immediately available. A consolidation controller similar to the one previously described could be added to coordinate the activities of such a consolidation structure.

When a container is appropriately positioned so that an operator may place the received goods therein, the work center controller causes monitor 455 to instruct the operator as to which specific container and compartment within the container the received goods should be placed. Further, the work center controller would direct the operator to place particular goods within the consolidation structure when necessary.

Referring next to FIG. 18, a control architecture suitable for use in conjunction with the embodiment shown in FIG. 12 will be described. The primary local area network (LAN) 69 interconnects master controller 26 with storage facility controller 70 and a plurality of work center controllers 72. The work center controllers take the form of issue work station controller 75, receiving work station controller 76, packing work station controller 77, inspection work station controller 78 and shipping work station controller 79. The storage facility controller 70, issue work station controller 75, and receiving work center controller may all be as previously described. The remaining controllers are constructed similarly to the extent that they control similar machinery. Further, they include specific software and files to accomplish their designated tasks.

Each controller includes procedures for accomplishing its designated tasks. For each of the controllers, FIG. 18 schematically displays representative functional files that are adapted to perform the described tasks. The files have been assigned numbers to facilitate this description. It should, however, be appreciated that the functional files described are by way of example only and that their number descriptions are not intended to indicate priority or the like.

File 1 is the inventory record. As previously described, an inventory record is kept which keeps track of all of the goods in inventory together with an indication of the container(s) and compartments within the containers in which specific goods are stored. In one of the preferred embodiments, the inventory record is kept by the master controller 26 and includes a listing of the contents in each compartment of each container. Thus, when it is necessary to locate empty containers or those having empty compartments of a particular desired size, a listing of such containers can be readily ascertained by searching through the inventory record.

File 2 is the storage record which is a record made by the storage facility controller to keep track of what containers are within its possession and the specific carousel and rack position where each containers is stored. As previously indicated, the storage record may be continually updated by checking the inputs of the identification scanners 126 which actually read the identifying indicia 36 on the containers stored on the storage carousel as it rotates. The storage record is also updated in the event of known insertions onto or extractions from the various storage carousels.

File 3 is an allocation file. Each of the work station controllers and the storage facility controller maintains an allocation file that indicates the specific containers within its control. The allocation file for the storage facility controller may be a subpart of the storage record or it may take the form of a separate file. The master controller maintains a master allocation file that keeps track of where each container is within the warehousing system. The various stations periodically update the master controller as to the containers within their control. The updating can take the form of merely indicating the containers received and discharged or the entire updated allocation files may be periodically transferred to the master controller.

File 4 is a receipt due in file. It keeps track of the goods that have been ordered for addition to the warehousing system. Every time a purchase order is made, the details of the order are entered into the master controller in the format of the receipt due in file. The receiving work station periodically receives an updated version of the receipt due in file. Thus, when goods are received, they may be checked against the receipt due in file to insure that only properly received goods will be entered into the warehousing system.

File 5 is a customer order file. Every time a customer places an order, the order is entered into the master controller 26. As previously discussed, the orders may be divided into one or more batches of orders for related goods. Of course in the setting of a production warehousing system, the orders may take the form of kit requests for production.

File 6 is an issuing in process file. When the master controller divides the pending orders into batches, it creates issuing in process files which contain all of the information that the issue work station will require in order to independently process all of the orders in its batch. Specifically, in a typical system, this would include indications of the specific orders to be processed, including the particular items and quantities requested in each order, and an indication of the specific containers (including a compartment designation) which carries each of the ordered goods. At the beginning of any issuing process, the master controller would transmit an issuing in process file to the issuing work station controller responsible for the particular batch of orders.

File 7 is a receiving in process file created initially by the master controller and updated by the receiving work station. As discussed earlier, it is contemplated that many of the containers will have multiple compartments and that in most instances, the containers will be refilled before all of the compartments are empty. Since the inventory record keeps track of the number of goods in each container compartment, the master controller will be able to determine which containers have empty compartments. Thus, selection for refilling may be made using any desired algorithm. The master controller creates the receiving in process file which includes extended lists of containers having open compartment of each desired size. At the beginning of any receiving cycle, the master controller will transmit the receiving in process file to the receiving work station controller. Thus, anytime the receiving work station requires additional containers having open compartments of a particular size, it sends an acceptable container list made up of containers having open compartments of the desired size to the storage facility controller together with an indication of the number of containers desired.

File 8 is a packing in progress file which like the other in process files indicates the containers holding items that the pack/wrap work station is expected to handle together with an indication of the items and packing directions. Files 9 and 10 accomplish the sue function for the shipping work station controller and the inspection work station controller respectively. Each of the in process files is created (or at least administered) by the master controller 26. The in process files are then transmitted to the appropriate work station which preferably can work substantially independently to accomplish the designated tasks. The in process files could be sent in discrete batches or periodically updated. The packing, shipping and inspection in process files are particularly suited for periodic updates as opposed to discrete batch dissemination since they most often are handling goods that have been consolidated or otherwise worked at the issue station and the availability of the consolidated orders will be continually changing as the work day progresses.

There are a wide variety of other functional files that could also be provided to track goods or monitor operator efficiency. For example, a file could be provided that remembers each station that a particular container has been delivered to as well as the specific operators that have had worked on a order. Such records can be very useful in monitoring quality control and tracking the source of disappearing goods. Additionally, the system could be set up so that only authorized personnel could work in specific work stations or otherwise control the systems operation. Records could also be kept of operator efficiency.

Although only a few embodiments of the present invention have been described, it should be understood that the present invention may be embodied in many other specific forms without departing from the spirit or scope of the invention. Particularly, it should be understood that the actual construction of the various stations and their functional components may be widely varied. Additionally, the control architecture used with specific components may be readily varied within the scope of the invention to accommodate particular warehousing applications.

The types of containers used to store goods may also be widely varied. In some situations, the described totes and containers could be identical. In others, no containers at all would be necessary if the packages received into inventory included frames or the like that were suitable for storage directly on the storage structure.

It should also be appreciated that the actual number and types of work centers and storage structures can be widely varied without departing from the invention. Indeed one of the principle advantages of the invention is its modular construction which readily facilitates the introduction of additional work stations.

The system disclosed herein also has many applications outside traditional warehousing operations. For example the disclosed system could be incorporated into many production and/or repair facilities. Therefore, the present examples and embodiments are to be considered as illustrative and not restrictive, and the invention is not to be limited to the details given herein, but may be modified within the scope of the appended claims.

We claim:

1. A method of operating a storage system, the system including a plurality of operational stations connected by a conveyor network for conveying containers between the operational stations, a first operational station comprising a storage structure having a multiplicity of container racks for holding the containers, means for rotating the container racks about a continuous track, and means for inserting containers into and for extracting containers from the storage structure, a second operational station comprising a work center having a work area for selectively adding goods to, withdrawing goods from or working goods within said containers, and a vertical storage queue for holding a plurality of containers in a region adjacent the work area, each said container having at least one compartment therein and an identifying indicia thereon, the method comprising the steps of:

loading goods to be stored into the containers;

recording the identity of the goods placed in each said container and maintaining an inventory record of the contents of each said container;

inserting loaded containers onto the container racks of the storage structure while the container racks are in continuous motion about the track;

receiving a request for a particular good stored within the storage system and checking the inventory record to identify a selected one of said containers that carries the particular good;

extracting the selected container from the storage structure while the container racks are in continuous motion about the track;

delivering the selected container to the vertical storage queue to be held thereon with other selected containers;

transferring containers disposed on the vertical storage queue to the work area as required to fulfill a request;

adding goods to, withdrawing goods from, or working goods in the containers transferred to the work area from the vertical storage queue; and transferring the containers from the work area to the vertical storage queue after the step of adding, withdrawing or working the goods is completed, and returning the containers to the storage structure for insertion thereon.

2. A method as recited in claim 1 wherein a plurality of orders for various goods are received, the method further comprising the step of repeating the inventory record checking and container extraction steps as necessary to ensure that the ordered goods are delivered to the vertical storage queue.

* * * * *